US005848396A

United States Patent [19]
Gerace

[11] Patent Number: 5,848,396
[45] Date of Patent: Dec. 8, 1998

[54] METHOD AND APPARATUS FOR DETERMINING BEHAVIORAL PROFILE OF A COMPUTER USER

[75] Inventor: Thomas A. Gerace, Cambridge, Mass.

[73] Assignee: Freedom of Information, Inc., Cambridge, Mass.

[21] Appl. No.: 634,900

[22] Filed: Apr. 26, 1996

[51] Int. Cl.$^6$ .................................................. G06F 19/00
[52] U.S. Cl. ................................. 705/10; 705/1; 705/10; 455/6.2
[58] Field of Search ................................ 386/1; 348/1, 2; 455/2, 6.2; 434/236; 705/1, 10

[56] References Cited

U.S. PATENT DOCUMENTS

| | | | |
|---|---|---|---|
| 4,659,314 | 4/1987 | Weinblatt | 434/236 |
| 4,718,106 | 1/1988 | Weinblatt | 455/2 |
| 4,930,011 | 5/1990 | Kiewt | 358/84 |
| 5,260,778 | 11/1993 | Kauffman et al. | 358/86 |
| 5,446,891 | 8/1995 | Kaplan et al. | 395/600 |
| 5,446,919 | 8/1995 | Wilkins | 455/6.2 |
| 5,504,675 | 4/1996 | Cragun et al. | 364/401 |
| 5,515,098 | 5/1996 | Carles | 348/8 |
| 5,636,346 | 6/1997 | Saxe | 395/201 |

FOREIGN PATENT DOCUMENTS

95/23371  8/1995  WIPO.

OTHER PUBLICATIONS

Bussey, H.E., et al., "Service Architecture, Prototype Description, and Network Implications of a Personalized Information Grazing Service," IEEE Multiple Facets of Integration Conference Proceedings, vol. 3, No. Conf. 9, Jun. 3, 1990, pp. 1046–1053.

Yan, T.W. and Garcia–Molina, H., "SIFT –A Tool for Wide–Area Information Dissemination," Paper presented at the USENIX Technical Conference, New Orleans, LA (1995, Jan.), pp. 177–186.

Pazzani, M. et al., "Learning from hotlists and coldlists: Towards a WWW Information Filtering and Seeking Agent," Proceedings International Conference on Tools with Artificial Intelligence, Jan. 1995, pp. 492–495.

Raggett, D., "A review of the HTML + document format," Computer Networks and ISDN Systems, vol. 27, No. 2, pp. 35–145 (Nov. 1994).

Gessler, S. and Kotulla A., "PDAs as mobile WWW browsers," Computer Networks and ISDN Systems, vol. 28, No. 1–2, pp. 53–59 (Dec. 1995).

Donnelley, J.E., "WWW media distribution via Hopewise Reliabe Multicast," Computer Networks and ISDN Systems, vol. 27, No. 6, pp. 81–788 (Apr., 1995).

Jones, R., "Digital's World–Wide Web server: A case study," Computer Networks and ISDN Systems, vol. 27, No. 2, pp. 297–306 (Nov. 1994).

Betts, M., "Sentry cuts access to naughty bits," Computers and Security, vol. 14, No. 7, p. 615 (1995).

(List continued on next page.)

Primary Examiner—Kevin J. Teska
Assistant Examiner—M. Irshadullah
Attorney, Agent, or Firm—Hamilton, Brook, Smith & Reynolds, P.C.

[57] ABSTRACT

Computer network method and apparatus provides targeting of appropriate audience based on psychographic or behavioral profiles of end users. The psychographic profile is formed by recording computer activity and viewing habits of the end user. Content of categories of interest and display format in each category are revealed by the psychographic profile, based on user viewing of agate information. Using the profile (with or without additional user demographics), advertisements are displayed to appropriately selected users. Based on regression analysis of recorded responses of a first set of users viewing the advertisements, the target user profile is refined. Viewing by and regression analysis of recorded responses of subsequent sets of users continually auto-targets and customizes ads for the optimal end user audience.

28 Claims, 10 Drawing Sheets

OTHER PUBLICATIONS

"My Yahoo! news summary for My Yahoo! Quotes", http://my.yahoo.con, (1997, Jan. 27).

"The Front Page", http://live.excite.com/?aBb (1997, Jan. 27) and (1997, Apr. 11).

"Welcome to Lycos," http://www.lycos.com, (1997, Jan. 27).

"AdForce Feature Set", http://www.imgis.com/index.html/core/p2—2html (1997, Apr. 11).

"Network Site Main", http://www.doubleclick.net/frames/general/nets2set.htm (1997, Apr. 11).

"NetGravity Announces Adserver 2.1", http://www.netgravity.com/news/pressrel/launch21.html (1997, Apr. 11).

Berniker, M., "Nielsen plans Internet Service," *Broadcasting & Cable*, 125(30):34 (1995, Jul. 24).

Information describing BroadVision One–to–One Application System: "Overview," p. 1; Further Resources on One–To–One Marketing, p. 1; BroadVision Unleashes the Power of the Internet with Personalized Marketing and Selling, pp. 1–3; Frequently Asked Questions, pp. 1–3; Products, p. 1; BroadVision One–To–One(™), pp. 1–2; Dynamic Command Center, p. 1; Architecture that Scales, pp. 1–2; Technology, p. 1; Creating a New Medium for Marketing and Selling BroadVision One–To–One and the World Wide Web a White Paper, pp. 1–15; http://www.broadvision.com (1996, Jan.–Mar.).

"Media Planning is Redefined in a New Era of Online Advertising," *PR Newswire*, (1996, Feb. 5).

*PRNewswire*, information concerning the PointCast Network (PCN) (1996, Feb. 13) p. 213.

"Netscape & NetGravity: Any Questions?", http://www.netgravity.com/, (1996, Jul. 11).

"IPRO," http://www.ipro.com/, Internet profiles Corporation Home and other Web Pages (1996, Jul. 11).

"The Pointcast Network," http:/www.pointcast.com/, (1996, Spring).

"ABI WHAP, Web Hypertext Applications Processor," http://alphabase.com/abi3/whapinfo.html#profiling, (1996, Jul. 11).

Hoffman, D.L. et al., "A New Marketing Paradigm for Electronic Commerce," (1996, Feb. 19), http://www2000.ogsm.vanderbilt.edu novak/new.marketing.paradigm.html.

"Real Media," http://www.realmedia.com/index.html, (1996, Jul. 11).

McFadden, M., "The Web and the Cookie Monster," *Digital Age*, (1996, Aug.).

Weber, Thomas E., "Software Lets Marketers Target Web Ads," *The Wall Street Journal*, Apr. 21, 1997.

User  37a identifiers
        nickname
        password (optional)
        e-mail
            forward all messages received to that user
        postal address
        phone
        credit card
    attributes
        language
        geographic
            country
            home zip
            work zip
            home area code
            work area code
            cities of interest
        demographic
            gender
            age
            income bracket (estimated or volunteered)
            occupation (volunteered)
        lifestyle
            language
            smoker
            orientation
            lifestyle (vegetarian)
            race
            drinker
            marital status
            music
            weight
            height
        Sponsor interest list (user choose from)
            DW
            Pepsi
            Coke

FIG. 3B enabling technologies
   (use/don't use flag for each for this user) Even if don't
   use, track presence for advertiser reporting.
      helper apps list - can user hear audio,
         video, what browser
      plug-ins list
      NLO list
      persistent ActiveX objects ←—— 37b

FIG. 3C

*User Interface Profile*
   User computer ID
   categories ←—— 37c
   category display

FIG. 3D

*User Session*
   referring link
   start datetime
   end datetime ←—— 37d
   computer ID
   browser type

FIG. 3E

*User Action History*
   action datetime
   session ID           37e
   *ordinal sequence identifier*
   page ID
   object clicked ID
   *object position on page*
      what was the context of the object that
      precipitated the action
         $1^{st}$, $2^{nd}$, $3^{rd}$ item?
      Right or left side

FIG. 3F

*User Viewing History*        37f
    open datetime
    leave datetime
    ID
    *ordinal sequence identifier*
    precipitating action ID
    related object ID
    item ID
    item orientation
        orientation relative to related object ID (either a page or an object). Must track each orientation separately, in case an ad encompasses an object.
            top
            bottom
            left
            right
            background

FIG. 3G

*Messages/Notices and Warnings*      45
    to user
    from user
    include identifier
    subject
    message
    ad package ID (optional, system choice if null; if designated ID is expired package, look for next package by advertiser. If none, system choice)
    Page ID (to forward a page reference)
    Link to additional info
    Messages will be sent either internally * or * through e-mail
    Notices and Warnings will always be sent internally and be duplicated through e-mail if possible.
    Delivery Date
    Read date (specific user read msg on date/time)

FIG. 4B

User Homepage    43
    Stock Table
        portfolio
            *open*
            *bid*
            *ask*
            *last*
            *$ change*
            *52 wk high*
            *52 wk low*
            *p/e*
    Sports
        Scores from previous 2-3 nights games in table
        News
    Weather
        5 day forecast for local area
            *High*
            *Low*
            *Precip*
        5 day forecast for interested cities
        Weather warnings if any for local or interested cities
    Travel Schedule
        Selected/purchased items that are coming within one week (Table showing options)
        Specials advertised to areas of interest
    Directory
        Typically called numbers for an area (in a table, names are hotlinks for any with e-mail)
    Messages
        Classified replies
        Personals replies
        Real Estate replies

FIG. 4A

*Sponsor*                                           /—33a company name
    user IDs
    contact info (for users to contact our sponsors)
        phone
        e-mail
        URL
        Fax
        Mail
    account contact info
        phone
        e-mail
        URL
        Fax
        Mail
    IP Domain list
    Demographic profiling
        Type of business
            SIC Code
            SIC Industry name
        Size of company
            employees
            revenues
            earnings
        Location
        Local/Regional/National/Multi-national/Global
        Producer
        Publically traded (yes/no)
        Exchange listings
    Customized Report Configurations-Standard Reports per ad
        Packages included (default is all)
        Variables included
        Display preferences
            Include regression ?
            Graphical ?
            Show control group ?

FIG. 5A

*Ad Package*     33b

Sponsor ID
    Info for exact # purchases
        Number of Purchased Hits
        Number of Purchased Clickthroughs
    Info for scaled purchases (up to ...)
        Max Hits
        Max Clicks
    Start Datetime (if not present, active until end date)
    End Datetime (if not present, is active after start date)
    # hits (derived)
    # clicks (derived)
    pricing of ad package
        hit
        clickthrough
        order

FIG. 5B

*Ad Series*     33c package ID
    intended demographic profile(s) list
    category (product/service)
    daily start time-hr. of day
    daily end time
    Display Days of week
    Start Datetime (if not present, active until end date)
    End Datetime (if not present, is active after start date)
    Max. series views per user
    Max. series views per user per day

FIG. 5C

Advertisement  33d
    series ID (must be present for all ads in a series, or null for all if random display is desired)
    series sequence
    display characteristics
        daily start time
        daily end time
    graphic ref's
        multi-format
    sound ref(s)
    multimedia refs
    X-type Refs (e.g. shockwave)
    text-only format

FIG. 5D

METHOD AND APPARATUS FOR DETERMINING BEHAVIORAL PROFILE OF A COMPUTER USER

BACKGROUND

In traditional print media, the term "agate" was originally used to refer to any information printed in columns 1.5 inches wide in 5 point type (e.g., stock quotes). Today, agate is used to refer to time-sensitive, reference information that is not read linearly. Examples are telephone listings, classified advertisements, weather reports, sports scores and statistics, market data, books and recordings in print, and television and film listings.

Some types of agate require continual updating in the short term, like stock quotes, while other types have a longer life, like travel information and business directories. The newspaper industry is one of the primary suppliers of agate. Newspapers provide listings of stock quotes, television and radio programming, film schedules, and classified ads. A second group of agate suppliers are book publishers. From travel guides to books in print, a wide variety of books provide agate information that changes monthly or yearly.

Although many types of agate are traditionally found in publications (e.g., newspapers, magazines, and books), all agate can be placed into large indexed databases. Because agate is non-linear reference material, it is often more efficient to search for agate in a database, than to scan columns of a newspaper.

One of the largest pools of databases and electronic media is found on The Internet. The World Wide Web (Web) is a two-year-old protocol used to create and publish documents on the Internet. Web documents may contain graphics, text, sound, video or any combination of these. Web documents can include "hyperlinks" which are highlighted areas of information in one document that, when user-selected, open a related document. In late 1994, "forms" were added to the Web to make it interactive. Previously, Web pages could only be used to display information or point to other Web sites where information was available. The 1994 change allowed those publishing Web pages to publish "forms", i.e., documents that include blank spaces to be completed by users and then returned to the publishing computer, thus allowing interactivity.

Publishing information on the Web requires two software components. Electronic publishers must run HyperText Transfer Protocol (HTTP) server software. Users scanning or searching on the Internet must use Web browser software. A variety of firms including Microsoft, Oracle, Netscape Communications, Spyglass, Spry, Netcom, and EINet all distribute Web software.

A variety of businesses are now offering information, some of it agate, on the Internet. One example is newspaper distribution on the Internet. However, the agate found in newspapers is at least twelve hours old. In the case of stock quotes, the information found usually recaps trading for the previous day, listing the high, low and closing prices as well as the number of shares traded. While this information is sufficient for tracking investments, investors often require real-time information to trade on the market.

Other examples of businesses that offer agate information on the Internet are Movie Phone whose World Wide Web Site is WWW.777film.com and Securities APL (at WWW.secapl.com) which allows users to look up individual stock quotes (delayed 15 minutes).

To date, however, there is no general agate provider on the Web.

SUMMARY OF THE INVENTION

The present invention uses agate information to determine the profile of a computer user, and in particular the behavioral or psychographic profile, as distinguished from the demographic profile, of a user. To accomplish this, the present invention provides (i) a data assembly for displaying customized agate information to a computer user, and (ii) a tracking and profiling member for recording user activity with respect to agate information displayed through the data assembly. Over time, the tracking and profiling member holds a history and/or pattern of user activity which in turn is interpreted as a user's habits and/or preferences. To that end, a psychographic profile is inferred from the recorded activities in the tracking and profiling member.

Further, the tracking and profiling member records presentation (format) preferences of the users based on user viewing activity. Preferences with respect to color schemes, text size, shapes, and the like are recorded as part of the psychographic profile of a user. In turn, the psychographic profile enables the data assembly to customize presentation (format) of agate information, per user, for display to the user.

In the preferred embodiment, the data assembly displays agate information and/or advertisements (combined in a common screen view or separately in respective screen views). The advertisements (stored in an advertisement module, for example) are displayed to users in accordance with the psychographic profile of the user.

The tracking and profiling member also records demographics of each user. As a result, the data assembly is able to transmit advertisements for display to users based on psychographic and demographic profiles of the user to provide targeted marketing.

In accordance with another aspect of the present invention, there is a module (e.g., advertisement module) that records history of users viewing the advertisements. For each advertisement, the module records (i) number of times viewed by a user; (ii) number of times selected for further information by a user, and/or (iii) number of purchases initiated from display of the advertisement to a user.

In addition, a subroutine coupled to the module performs a regression analysis on the recorded history of users viewing the ads. The subroutine refines profiles of target users based on the regression analysis. Preferably, the regression analysis weights the relative importance of psychographic and/or demographic characteristics of users. As such, over time, the advertisements become better targeted to users having an interest in said information (content and presentation/format of ad), and hence the invention method and apparatus provides automatic targeting of audiences (target users) and self-tailoring of target profiles.

The preferred embodiment utilizes object oriented programming techniques to provide a User Object. The User Object tracks user actions in a history profiling table. The User Object utilizes an updating routine which maintains the history profiling table by storing in the table an indication of a user's actions, i.e., computer activities, with respect to displayed agate information.

In accordance with another aspect of the present invention, there are Agate Objects for providing the agate information and a Sponsor Object. In a preferred embodiment, the agate information includes stock information, advertisements, sports statistics, weather reports and the like. With regard to stock information, an Agate Object routine receives stock data on line, parses the data and makes a value-added calculation. As a result, the stock information is made searchable by variables such as price-earnings ratio, and the like.

The Sponsor Object categorizes advertisement or other sponsor provided information according to content and presentation, including colors used, size, shape, and whether audio and/or video components are involved. An advertiser profile building routine automates the process of identifying colors, size, shape, and whether video and/or audio are involved.

Also the Sponsor and User Objects track how many times each piece of advertisement information is shown to, is selected by and/or spawns a purchase by users. In other words, the Sponsor and User Objects track performance of sponsor provided information, especially advertisements. In the preferred embodiment, a performance routine employs regression techniques to provide performance reports. The performance routine may also be run (executed) remotely by suppliers of the advertisement information.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

FIGS. 3a–3g, 4a and 4b, and 5a–5d are schematic diagrams of a preferred embodiment.

DETAILED DESCRIPTION OF THE PREFERRED EMBODIMENT

Figure 1:
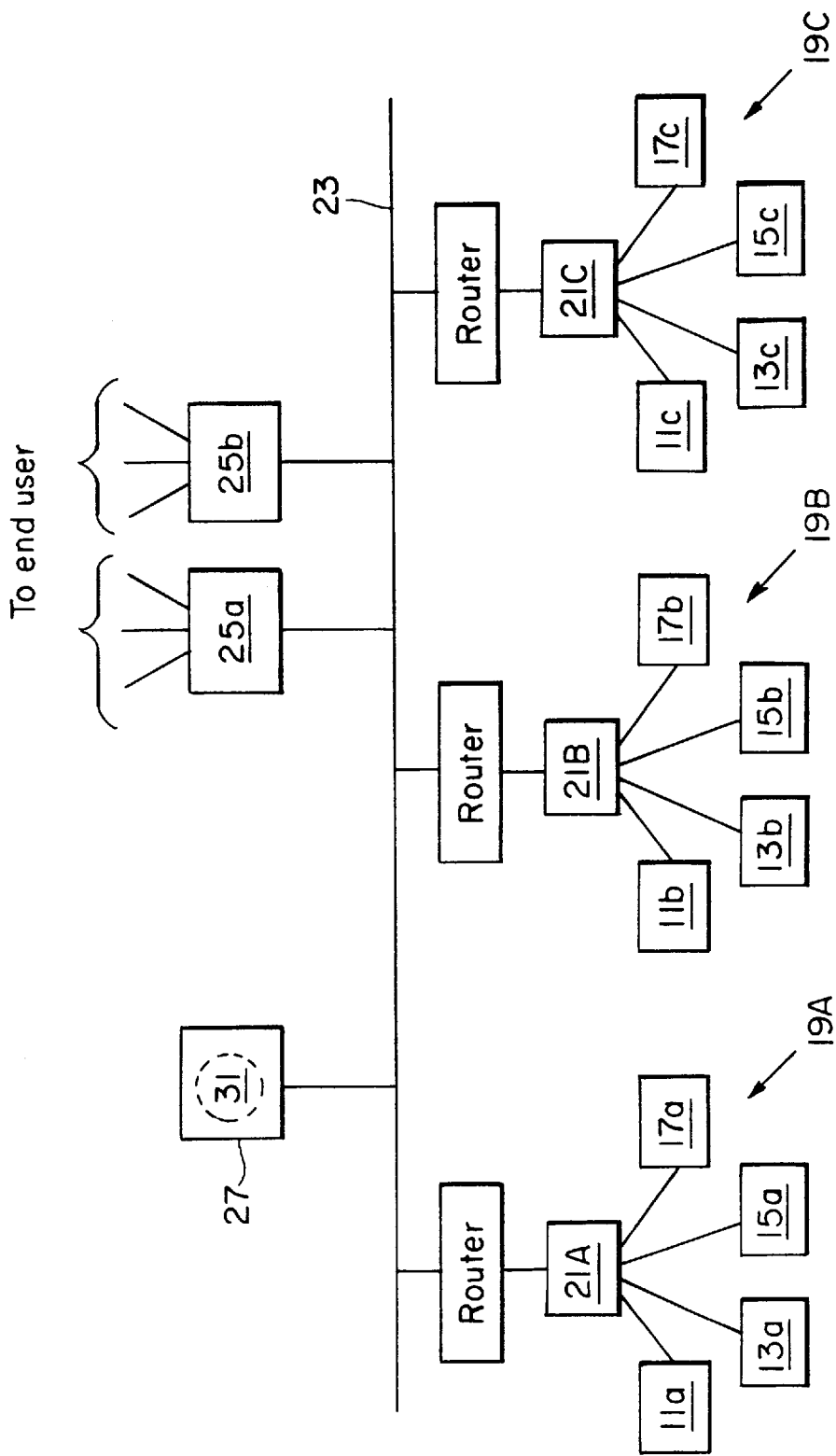
FIG. 1 is an overview of a computer network environment in which the present invention is employed.

Illustrated in FIG. 1 is a plurality of networks 19a, 19b, 19c. Each network 19 includes a multiplicity of digital processors 11, 13, 15, 17 (e.g., PC's, mini computers and the like) loosely coupled to a host processor or server 21a, 21b, 21c for communication among the processors within that network 19. Also included in each network 19 are printers, facsimiles and the like. In turn, each host processor 21 is coupled to a communication line 23 which interconnects or links the networks 19a, 19b, 19c to each other to form an internet. That is, each of the networks 19 are themselves loosely coupled along a communication line 23 to enable access from a digital processor 11, 13, 15, 17 of one network 19 to a digital processor 11, 13, 15, 17 of another network 19. In the preferred embodiment, the loose coupling of networks 19 is the Internet.

Also linked to communication line 23 are various servers 25a, 25b which provide to end users access to the Internet (i.e., access to potentially all other networks 19, and hence processors 11, 13, 15, 17 connected to the Internet). The present invention is a software program 31 operated on and connected through a server 27 to the Internet for communication among the various networks 19 and/or processors 11, 13, 15, 17 and other end users connected through respective servers 25. In the preferred embodiment, the server 27 is a Digital Equipment Corp. Alpha server cluster (e.g., 2400–8000 Series), or a multiplicity of similar such servers. Server 27 runs Oracle 2.0 Webserver as HyperText Transfer Protocol (HTTP) server software to support operation of present invention program 31.

Upon an end user logging onto program 31 through common Internet protocol, program 31 generates an initial screen view (commonly known as the "Home Page") for display to the end user. During the user's first visit, the initial screen view provides menu selections of various agate information (e.g., stock market data, weather, sports, etc.) Upon user selection (using a click of a mouse or other input means) of a menu item, program 31 displays corresponding up-to-date information. Similarly, each time the user selects another menu item, program 31 generates and displays current agate information relating to that selection.

In addition, program 31 records the user's selections and his viewing activity with respect to the agate information. In particular, for each piece of displayed agate information, program 31 records the date and time of user viewing and the format which the user has selected for viewing. After multiple sessions, a pattern of the user's viewing actions or viewing habits is obtained, from the recorded activity. In turn, certain inferences about the user are made based on the user's viewing habits and the specific pieces of agate information he views, including content and presentation of that information. To that end, for each user the present invention program 31 creates a user profile from the agate information viewing habits of the user. The system then generates a custom Home Page, including a user's preferred (content and presentation) agate information. On subsequent visits to program 31 (as a Website) by the user, program 31 displays the customized Home Page for that user instead of the initial Home Page.

Based on the created user profile for a given user, program 31 enables sponsors to better direct their advertisements and enables advertisements to be tailored to target users' display preferences. That is, both subject matter/content and presentation of advertisements are able to be customized to the end user's preferences due to the information tracked and recorded (i.e., the created user profile) by program 31.

Figure 2:
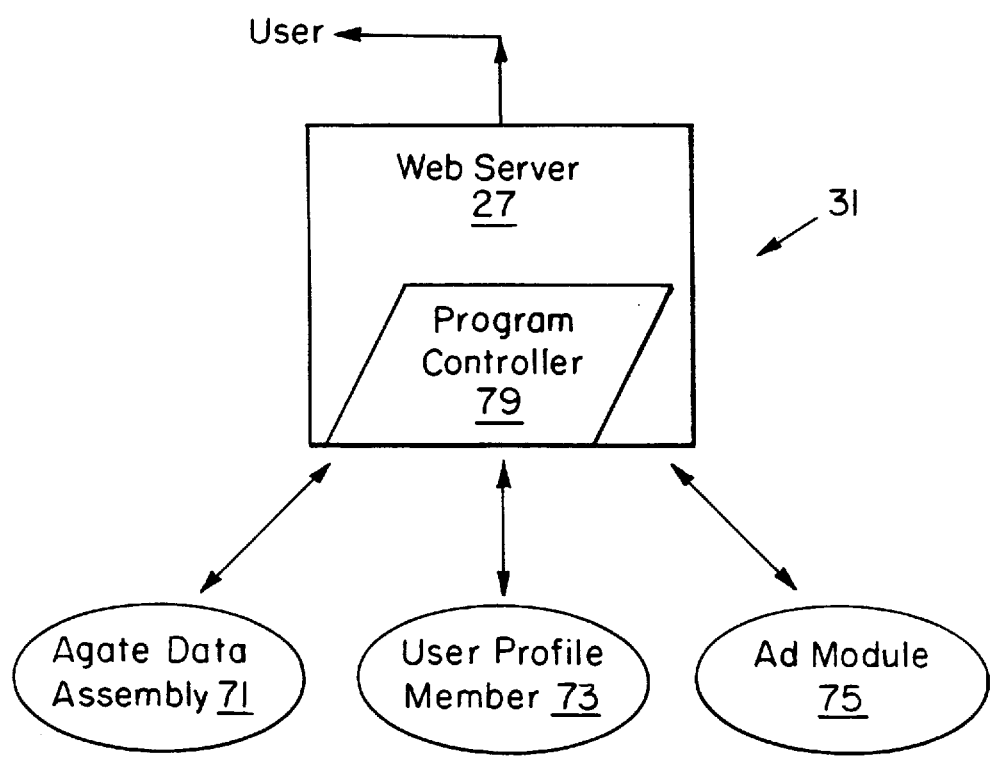
FIG. 2 is an overview of a general embodiment of the present invention.

Accordingly, program 31 in its most general form has an agate data assembly 71, a user profiling member 73, an advertisement module 75 and a program controller 79 as illustrated in FIG. 2. The agate data assembly 71 stores the various agate information for user viewing. The user profiling member 73 records information regarding each user, including a user's identification, categories of interest and the user's display preferences of each category. Advertisement module 75 holds sponsor information and their advertisements, with a target audience profile indicated for each advertisement.

Program controller 79 is a series of routines (methods) on Web server 27.

The program controller 79 responds to commands (e.g., log in and menu selections) transmitted over the Internet by an end user, and obtains the necessary information from agate data assembly 71, user profiling member 73 and advertisement module 75 to generate and display appropriate screen views to the user.

In particular, in response to user login, program controller 79 checks with the user profiling member 73 to determine whether the user has in the past logged on to program 31 or is a new user. In the former case, according to records in the user profiling member 73, the program controller 79 obtains preference information for that user and using agate information from the agate data assembly 71 generates an initial screen view formatted according to the user's recorded preferences. Program controller 79 transmits the generated screen view through Web server 27 for display to the user.

In the latter case (a first time/new user), program controller 79 assigns a unique users computer ID upon user login.

This, in turn, enables user profiling member 73 to initialize tracking of viewing activity of the new user immediately following login. Program controller 79 obtains initial agate information from agate data assembly 71 to display the Home Page to the new user. Program controller 79 also obtains user identification information from the user to assign a user name and password at the user's convenience.

In either case, throughout the session, program controller 79 responds to user selections and viewing actions (screen formatting commands/requests, menu selections, etc.) by (i) using the agate data assembly 71 to obtain and display the requested information and (ii) using the user profiling member 73 to record the user's activities and thus build a psychographic/behavioral profile of the user.

With respect to the advertisement module 75, program controller 79 obtains sponsor submitted advertisements from module 75 and generates a screen view formatted according to user preferences as determined from the psychographic profile in the user profiling member 73. That is, program controller 79 enables display of advertisements customized to the user, as to content and presentation (i.e., colors used, orientation on the screen, audio/video components, and the like). Program controller 79 obtains the content from the advertisement module 75 and the presentation details for the subject user from the user profiling member 73.

In addition, for each advertisement, advertisement module 75 (and/or user profiling member 73) records (a) the number of times and/or number of users to whom the advertisement has been displayed, (b) the number of times/ users who have requested more information (via a click of a mouse on a corresponding menu selection) regarding the advertisement, and when possible (c) the number of purchases obtained through program 31's display of the advertisement. As such, advertisement module 75 holds performance data for each advertisement, and hence enables program controller 79 to provide performance reports to sponsors who log on to program 31. Various regression techniques and the like are used in the performance reports in a manner consistent with the state of the art.

In the preferred embodiment, program 31 is implemented as an object oriented program discussed next with reference to FIGS. 3a through 5b. Each object is formed of data and subroutines (methods) for acting on the data. The data is preferably stored in tables and each table is formed of a multiplicity of records or fields of information. The information held in a record in respective tables of the objects is illustrated in FIGS. 3b through 5b and discussed below with the details of each object. It is understood however that other program means, techniques, data structures and program designs for present invention system 31 are suitable. Thus the details of the preferred embodiment in FIGS. 3a through 5b are for purposes of illustration and not limitation.

Figure 3A:
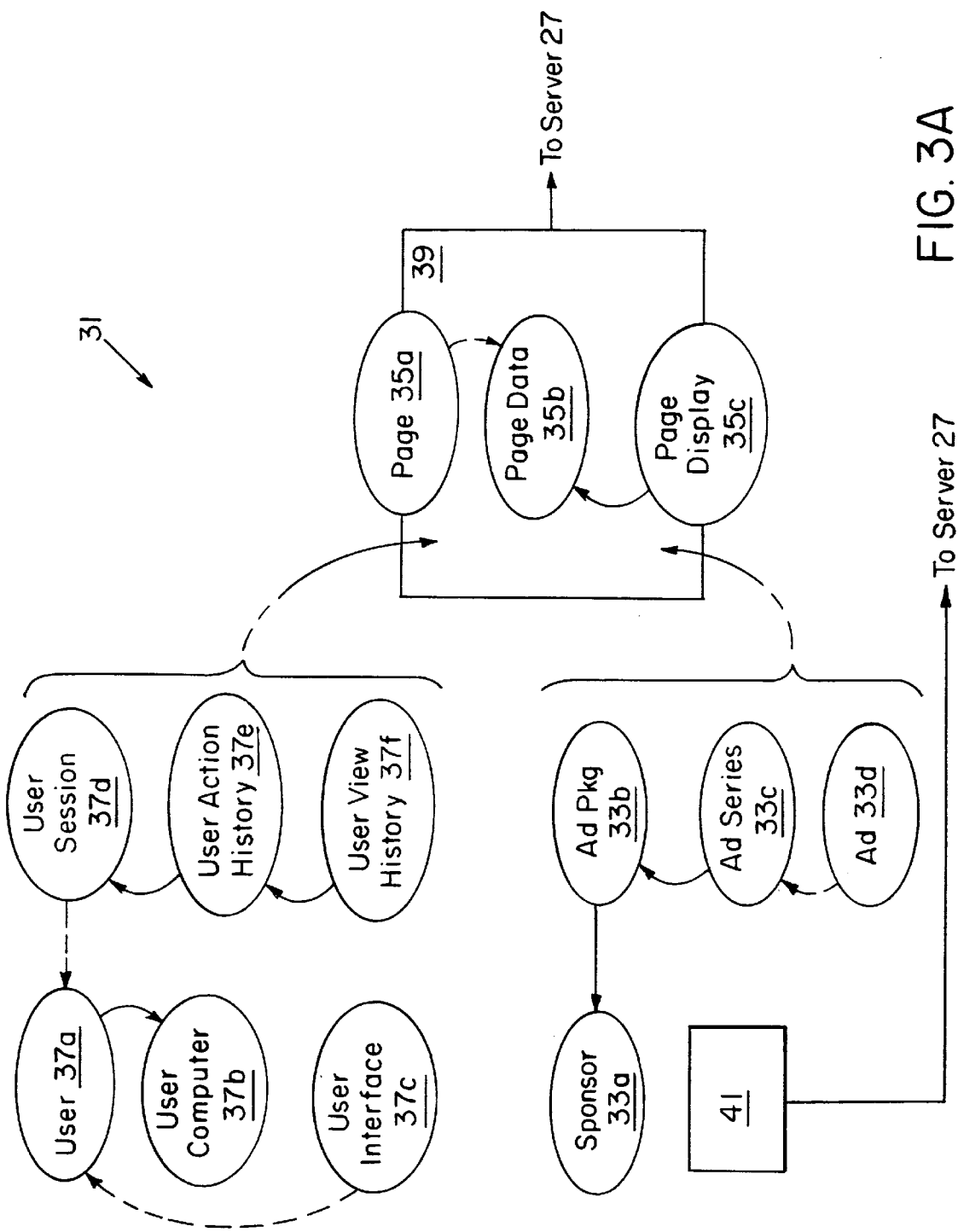

In FIG. 3a, a set of User Objects 37 provides the functional equivalent of the user profiling member 73 of FIG. 2. A set of Page Display Objects 35 provides the functional equivalent of agate data assembly 71 of FIG. 2. A set of Sponsor Objects 33 provides the functional equivalent of the advertisement module 75 of FIG. 2. The main routine 39 of program 31 in FIG. 3a functions similarly to the program controller 79 of FIG. 2 as will become apparent in the following discussion.

Turning to FIG. 3a, the purpose of the set of User Objects 37 is to identify users and maintain a user profile for each user. Included in the set of User Objects 37 is general information about users and their computers, as well as specific data on each computer session undertaken by the users. In particular, for each set there is a User Object 37a. User Object 37a identifies a respective user by nickname (user chosen), password (user chosen), and optionally E-mail address, postal address, telephone number, credit card number, and the like. User Object 37a also provides language, geographic, demographic and lifestyle information about the user. To accomplish this, User Object 37a stores a separate record for each of the above mentioned information, the collection of records forming the table or data of User Object 37a. FIG. 3b illustrates the fields or records of information employed by User Object 37a in the preferred embodiment.

Also for each user, there is a User Computer Object 37b and a User Interface Object 37c. For each user's computer, User Computer Object 37b provides an indication of the limitations and capabilities of the user's computer system. For example, User Computer Object 37b lists whether the user's system provides audio and/or video display, and what Web browser software is utilized by the user's system. An outline of the table/data set of a User Computer Object 37b in the preferred embodiment is illustrated in FIG. 3c.

The User Interface Object 37c provides a unique (preferably numeric) identifier of the user. The User Interface Object 37c also provides indications of categories of interest to the user and a primary screen display for each category customized to that user. The foregoing information is held in records illustrated in FIG. 3d. In the preferred embodiment, the various categories of interest include stock trading portfolio, sports, news, weather, theater and television schedules, telephone directory, travel data, classified ads and personals information, and the like. Display preferences include orientation, color scheme, screen quadrant/ location and the like, indicated with respect to the category of information. For example, one user may tend to like stock information displayed in tabular form on a blue background and weather displayed on a map scene. Another user may prefer stock information displayed in a running 1-line quote at the bottom of the screen and weather displayed in a tabular format by city on a green background, and so forth.

The history of user activity with executed program 31 is also maintained by the set of User Objects 37 (FIG. 3a). Specifically for each user, a User Session Object 37d, User Action History Object 37e and User Viewing History Object 37f record the following as illustrated in FIGS. 3e–3g.

Each time a user logs on to program 31, User Session Object 37d records the starting date and time and ending date and time of the session. User Session Object 37d also records (a) the referring link from which the user accessed program 31 (e.g., a so called "bookmark" or "hyperlink" which effectively stores and forwards the Web site address of program 31), (b) the user's identification number (e.g., as stored in a so called "cookie" passed by the user's computer upon logging in), and (c) an indication of Web browser software employed by the user's computer. FIG. 3e illustrates the records created by User Session Object 37d to accommodate the foregoing data.

The User Action History Object 37e stores each click of a mouse and corresponding cursor position to effectively record the user's motions/movements in a session. In particular, as illustrated in FIG. 3f, User Action History Object 37e records (a) date and time of action, (b) session identifier (indicating in which session of the User Session Object 37d the subject action occurred), (c) sequence or order number of the action in the series of actions that occurred in a common session, (d) identification of screen view displayed at time action occurred, (e) identification of item selected by user (via click of mouse with cursor positioned on item), and (f) screen position of selected item (e.g., first, second or third menu item, right or left side).

The User Viewing History Object 37f stores information indicative of the screen views displayed to the user in a session. Specifically, User Viewing History Object 37f records an item identification (either agate or advertisement) and orientation of that item for each item displayed to (and hence viewed by) the user in a session. Orientation is noted relative to a page/screen view or an object identified in the "related object ID" field of the User Viewing History Object 37f. Preferably, orientation is indicated as being top, bottom, left, right or background of the screen view. The Viewing History Object 37f also records an identifier (of each screen view), ordinal sequence number (number order of screen view within series of screen views displayed in a session), and an indication of the action from which this screen view resulted (i.e., a reference to a corresponding User Action History Object 37e). Lastly, the User Viewing History Object 37f records date and time of screen opening and closing for each screen view. The foregoing is stored in an object table record illustrated in FIG. 3g.

Returning to FIG. 3a, the set of Page Display Objects 35a–35c defines the screen views transmitted and displayed to end users. A Page object 35a cross references a User Interface Object 37c which specifies which Page Display Object 35c and which agate information (content and presentation) is appropriate for the current user. Page Data Objects 35b hold the agate or other data to be displayed to end users. Included are advertisements (objects themselves) which may be integrated into the agate data. Preferably advertisements are positioned along the periphery (i.e., above, below, left or right) of the agate data, as defined by a respective Page Display Object 35c. Accordingly, Page Data Objects 35b support Page Display Objects 35c which outline the possible screen content and presentation formats in which agate data advertisements are to be displayed.

In the preferred embodiment, Page Display Object 35c provides outlines for a Home Page, Financial Pages (screen views), Sports Pages (screen views), Weather Pages (views), a Media Schedule Page, Directory Page, Travel Options Page, Classified Ads Pages, and Real Estate Pages (screen views) as specified in Appendix I. Each is discussed next with reference to FIGS. 4a–4b and Appendix I.

Referring to FIG. 4a, Page Display Object 35c defines a Home Page 43 format for program 31. The preferred Home Page format includes six categories of agate information stock data, sports, weather, travel schedules, directory information and Classified/Personals/Real Estate messages. The stock data category provides portfolio information such as opening price per share, change in price from last posting, 52 week highs and lows, etc. If a user selects the stock data category (i.e., as a menu selection) for further viewing, a Page Display Object 35c in the form of a Financial Page (screen view) is generated in one of the alternative formats outlined in Appendix I.

Briefly, five types of Financial Pages Objects 35c are utilized by the preferred embodiment. They are named "Stock Page", "Company Page", "Expert Articles Page", "Expert Guide Page" and "Show Me Some Page" (see Appendix I). The "Stock Page" includes (a) data on user-selected stocks in a tabular format, a portfolio value graph and message window (for quickly moving companies present and titles of articles by experts in the field), (b) a tracking list, (c) indices such as Dow Jones Industrial Average and NASDAQ, and (d) a ticker customized to the user (user-selected stock). The expert articles are formatted on screen views for display according to the "Expert Articles Page" format. The "Company Page" format includes the trading symbol/code, stock information and corporate data about a specific company. The "Expert Guide Page" and "Show Me Some Page" formats enable the user to interactively create his own screen display of stock information. In particular, the Expert Guide Page surveys the user on his investment interests. Using the Expert Guide Page and Show Me Some Page formats, Page Display Object 35c then displays names of companies found to match the user provided criteria.

In each of the foregoing formats, the preferred embodiment includes incorporation of ads or sponsorship indications as top and/or closing banners. The Home Page 43 (FIG. 4a) provides scores of recent games and news in the "sports" category. If a user selects the sports category from the Home Page, a Page Display Object 35c generates various screens bearing sports information and news. For sports pages/screen views, there are seven page/screen formats of Page Display Object 35c outlined in Appendix I. Briefly, a "General Sports Page" format includes (a) game scores and standings, by league, for professional and collegiate sports, and (b) player standings (professional and collegiate) for baseball, football, hockey and basketball. Statistics are updated and displayed during play of a game, so that the General Sports Page provides game-in-progress statistics in realtime. Also a news window is provided for each sport with a link to a "News Page" (object) for more news. The "News Page" format includes information regarding major trades, signings and injuries. In the preferred embodiment, a scrolling window of latest news is also included.

A "Team Page" format provides a roster of a given team. Thus program 31 has several Team Page Display Objects 35c. The roster lists players by name, jersey number, position and some statistics. A "Team v. Team Page" format lists similar information as the "Team Page" format but for two teams in facing columns. Indications of favored teams and game scores for an entire season are also provided on a "Team v. Team Page" Display Object 35c.

Player information is provided in three formats—a "Player Page" format, a "Player v. Team Page" format and "Player v. Player Page" format. Comparison of a player's statistics to his team's statistics is provided in a "Player v. Team Page" Display Object 35c. Comparison statistics of two players on different teams is provided in the "Player v. Player Page" format.

Further, some of the above sports page formats allow advertisements to be displayed at the top and/or bottom of the screen view in the preferred embodiment.

Referring back to FIG. 4a, the Home Page 43 also provides a weather category. Shown on the Home Page 43 under that category is a long-range (e.g., 5-day) forecast for the user's local area and cities of interest to the user. Also that category provides storm warnings and the like for local areas and cities of interest. Upon user selection of the weather category, a Weather Page Display Object 35c enables display of weather information in one of two formats—a National Weather Page and a Regional Weather Page (Appendix I). Briefly, the "National Weather Page" format displays temperature and precipitation indications across a relevant map, along with textual descriptions. Audio forecast readings are also provided. Incorporation of a sponsorship ad is provided at the top and/or bottom of the screen view (termed "banners" in Appendix I). The "Regional Weather Page" displays (a) a regional map (e.g., state) with temperature and precipitation indications, (b) a graphical forecast (e.g., high and low temperatures and sun/cloudy, rain or snow predictions for the next several days), and (c) a detailed forecast with tabular and textual descriptions. Also the Regional Weather Page provides weather warnings and advertisements at the bottom of the screen view in the preferred embodiment.

Referring back to the Home Page 43 of FIG. 4a, also included is a Travel Category. Data/information displayed in that category include travel and other ticket purchases of a user within an approaching date and specials advertised in areas of interest to the user. Upon user selection of the Travel Schedule Category of the Home Page 43, a Travel Page Display Object 35c enables display of a Travel Options Page (screen view).

The format of a "Travel Options Page" of the preferred embodiment is detailed in Appendix I. Preferably, there is one Travel Options Page for each of different cities. Briefly, for each Travel Options Page Display Object 35c there are three data parts. A first part is a table of transportation options, including departure, arrival and reservation information for airlines, buses, boats and trains. The second part is hotel information in a given destination (subject city). Preferably this information is in tabular form. The third data part of a Travel Options Page Display Object 35c is information regarding rental car options. Further the Travel Options Page format allows an advertisement to be displayed at the top of the screen view and at the end of a Travel Options Page.

Referring back to Home Page 43, FIG. 4a, the Directory category provides phone numbers typically called by a user. The supporting Directory Page format for this category is a table of names and corresponding mailing addresses (i.e., street, city, state, zip code), telephone and facsimile numbers, E-mail address and URL (universal resource locator). Preferably for those names with an E-mail address, the indicated name functions as a screen menu selection using hyperlink techniques.

The "Messages" category of the Home Page 43 includes information relating to personals advertisements, classified advertisements and real estate advertisements. Upon user selection of this category, a search is initiated with user provided parameters. An appropriate Page Display Object 35c enables display of the results of the search using a "Personals Page", "Classifieds Page" and/or "Real Estate Page" format outlined in Appendix I. Briefly, included in a Personals Page/screen view is geographic, demographic and life style information. Preferably, sponsor provided advertisements are able to be inserted at the top of the screen view and at the end (i.e., after) a Personals Page screen view.

The format of a "Classifieds Page" includes accommodations of sponsor provided advertisements (e.g., at a beginning screen view and/or end screen view of the Classifieds Page screen view). The "Classified Page" format also includes indications of the requested item, make/model/year, price and a description of the subject item.

Each Real Estate Page follows one of three formats—a "Citywide Listings Page", "Selected Listings Page" and "Individual Listings Page" detailed in Appendix I. Briefly, the "Citywide Listings Page" format provides a table of real estate properties indicating address, price, square footage, etc. Also provided is beginning screen view and end screen view advertisement ability. The "Selected Listings Page" format provides a table of user selected properties/listings, with more details than the "Citywide Listings Page" format. For example, number of rooms, heat type, parking, yard/deck and the like are indicated in the table. Advertisement ability across the top and bottom of the screen view is also indicated by the "Selected Listings Page" format. The "Individual Listings Page" format includes the details of the "Selected Listings Page" with added textual description, photo, city information and contact information. Advertisements at the beginning and end of the page/screen view are enabled by the "Individual Listings Page" format.

In the preferred embodiment, there is also a Media Schedule Object and respective screen view, accessible through the Home Page 43 of FIG. 4a. The format of the Media Schedule Page includes three tables of information— one table for television listings, one for film listings and one for live performance listings as illustrated in Appendix I. The television table lists for each program (show): the channel airing the program, start and end times, and other related information (e.g., rating, rerun, etc.) For each film, the film table lists, among other information, cinema where playing, show times, length in time, rating and indication of type of film. The live performance table includes symphony and theater performance schedules (show times) and place/ theater.

In the preferred embodiment, program 31 displays user generated messages and system generated notices (or warnings) to the end user in addition to the foregoing "Pages"/screen views of category information. FIG. 4b illustrates the preferred Message/Notice Object 45 screen view format. In the case of one user sending a message to another user through program 31, the displayed message includes indications of the sending and intended receiving users along with an identifier, subject and message, among other indicia. Attachments or additional information are enabled through a page reference (Page ID) and/or link indication. If the recipient selects (by a click of a mouse) the page reference or link indication, program 31 generates a screen view (i.e., Page Display Object 35c) displaying the additional information. Further messages are transmitted through E-mail or internally/local to program 31.

In the case of notices and warnings, program 31 initiates and transmits these. An intended receiver, notice/warning identifier, message, page ID and/or additional information link are included, similar to those described above for user-to-user messages, among other indicia as illustrated in FIG. 4b. Program 31 transmits notices and warnings both internally during execution/operation of program 31 and through E-mail.

In either case (user generated message or system notice/ warning), advertisements are allowed to be integrated. To accomplish this, the "Message/Notice Page" format 45 indicates an advertisement package ID (explained below).

In addition to the features of the Home Page 43 illustrated in FIGS. 4a and 4b and discussed above, the preferred embodiment provides user customization in the following ways. When a user is traveling away from the computers that he normally logs on through (i.e., home and/or office), program 31 enables the user to customize the initial screen view (i.e., Home Page 43). This is accomplished using the City Pages Objects outlined in Appendix II. In particular, an initial City Page screen view provides user access to travel options, media/cultural event schedules, Corporation Information, Weather and Directory information, all with respect to a specific city (e.g., destination cities in a business trip). To that end, from the City Page screen view, a Travel Options Page and corresponding object (from Appendix I) may be generated for the user's current town location and/or home town. Also, the City Page is an object (like Media Schedule Page Object in Appendix I) having a table listing media and cultural events, locations/channels of the same, and begin and ending dates and times, among other brief information.

From the City Page, as with the Home Page 43, a user is also able to obtain information on specific local companies utilizing Financial Page Objects (Appendix I). Preferably a Company Page Object is utilized. Thus, corporate information is presented in a table listing company name, and indications of industry, revenues and contact information (street address, telephone/facsimile numbers and E-mail address).

Information about the local weather as accessed from the City Page is preferably presented in a graphical five-day forecast format, similar to that described for the Regional Weather Page Object in Appendix I. Lastly, the City Page provides a Directory of numbers in the subject city which the user has previously accessed and hence are probably meaningful/useful to the user while staying in that city. Each entry in the Directory includes a name, address, telephone/facsimile number, and E-mail address. Also in the preferred embodiment, indications of changes of address are provided in the Directory.

In addition, program 31 enables user customization of content and format of screen views for each category of information. That is, for each of the Home Page 43 and City Page categories (financial information, sports, weather, travel, telephone directory, personals and classifieds), the user is able to request structured data, preformatted data packages and/or value-added analyses from program 31. Thus if a user provides certain data and an indication of desired form of analyses (ranging from a numeric indication to a simple yes/no indication), program 31 provides prepared analytical views for the user selected data in the subject category. Alternatively, program 31 provides prepared profiles to assist users in selecting data. In response to a user providing a simple analytical statement/request, program 31 responds with data that fits that request. For example, if the user requests college stocks, program 31 suggests some. Also direct user selection of category items and display format is enabled through this feature.

With respect to each of the Home Page 43 and City Pages categories, the foregoing user customizations are further described in Appendix III.

Lastly, program 31 enables user customization of Home Page 43. To that end, upon a user logging in (subsequent to a first time) to program 31, one category at a time is addressed to define a default. In subsequent uses of program 31, data appears in order of most frequently selected categories of the user, unless the user specifies otherwise. Also, categories that a user selects to view further which are not on his Home Page are added with three options: customize, remove from first page, or move to a user-specified xyz position. Also program 31 defaults to the current date information only, unless otherwise designated by the user.

Referring back to FIG. 3a, a set of Sponsor Objects 33 stores sponsor provided information, including advertisements desired to be displayed and details regarding the same. FIGS. 5a–5d illustrate the set of Sponsor Objects 33, referred to as Sponsor Object 33a, Ad Package Objects 33b, Ad Series Objects 33c, and Ad Objects 33d in the preferred embodiment and detailed next.

For each sponsor (or advertiser), a corresponding Sponsor Object 33a (FIG. 5a) stores in a table (or sponsor directory) the company name, numeric identification unique to that sponsor, user contact information and program 31 administrator contact information. Also Sponsor Object 33a records an indication of the demographic profile of the sponsor company itself in order to advertise to the sponsor company user as is appropriate. Further, Sponsor Object 33a indicates standardized report configurations (display preferences, etc.) for that sponsor.

Each sponsor has one or more ad packages maintained by respective Ad Package Objects 33b of the sponsor. In each Ad Package Object 33b (FIG. 5b) there is indicated the sponsor ID, start and end dates and times, and pricing of the ad packages. The pricing may be dependent on the number of times the ad is viewed by users (i.e., a "hit"), number of times a user selects to view more information from the ad (i.e., a "click through") and/or the number of times an actual order is generated. Pricing by the number of hits and number of click throughs by exact numbers or maximum numbers is indicated in the Ad Package Object 33b. Thus Ad Package Objects 33b serve as billing entities for the program 31 administrator. Also Ad Package Object 33b records the number of hits and click throughs as tracked/monitored during user operation of program 31.

Specific to desired ads, each sponsor has one or more Ad Series Objects 33c (FIG. 5c). An Ad Series Object 33c (FIG. 5c) provides an indication of whether a given advertisement is singly or serially displayed, the category of the information, and the demographic group pre-requested by the sponsor to be shown that advertisement. In a preferred embodiment, the sponsor specifies in Ad Series Object 33c the required and/or preferred psychographic and/or demographic criteria and relative importance (e.g., weight) with respect to each criterion. Further, the sponsor specifies in Ad Series Object 33c a minimum total weight of criteria to be met by a user to qualify the user to view the ad series. Also Ad Series Object 33c includes a reference to an Ad Package Object 33b (via an ad package identification), the hour of the day in which the ad/ad series is to start and end, the days of the week on which the ad/ad series is to be displayed, and the beginning and ending dates and times of the ad/ad series. Also for serially displayed advertisements, Ad Series Object 33c indicates the maximum number of views in a series to be displayed per user and per user per day.

Each ad forms a corresponding Ad Object 33d as illustrated in FIG. 5d. For a given advertisement, Ad Object 33d indicates to which series the advertisement belongs. To effectuate this, the Ad Object 33d indicates a series ID which references an Ad Series Object 33c, and indicates a series sequence (i.e., the ordering of the ads in a series). Ad Object 33d also includes the starting and ending time for display of the ad each day. Ad Object 33d also provides references to graphic, sound, and multimedia portions of an advertisement. A text-only format of an advertisement is used for users receiving messages on their own E-mail service or on a text-only browser (e.g., Links systems for VAX/VMS operating systems) rather than through the messaging feature of program 31.

Another part of the Sponsor Objects 33a–d is a computer subroutine 41 (FIG. 3a) which provides performance reporting. This enables the sponsors of the advertisements to obtain reports on successful use of the advertisements. The types of reports provided in the preferred embodiment of program 31 are outlined in Appendix IV. In that Appendix, "HTs" means hits and "CTs" means click throughs.

Briefly, an Overview Report provides a review by ad package. The number of hits and number of click throughs purchased and achieved are indicated among the cost of the package and date specified by the ad package.

A Detailed Package Report provides information on individual ad packages, including showing the ads included in the package with video and audio portions intact. The demographic profiling requested and demographic breakdown of success with respect to a control group are also provided in the Detailed Package Report. Also the number of hits and click throughs purchased and achieved are designated in the Detailed Package Report.

In the Demographic Response Rates Report, all ad packages of a sponsor or selected ones are compared. In particular, the ad success by the sponsor-targeted demographic groups is compared. Further the reporting subroutine 41 of program 31 calculates a regression on the targeted demographic groups for the ads, and the results of the regression calculation are used to suggest other demographic characteristics that are important factors in the number of click throughs and/or number of purchases. The advertiser may also run a complete regression report for all or certain ad packages.

A Psychographic Profiling Report is similar to the Demographic Response Report except a psychographic profile is used instead of a demographic profile. The reporting subroutine 41 makes regression calculations, and results of the calculations enable program 31 to suggest other psychographic characteristics that are important factors in the click throughs and/or purchases of the ads for a given sponsor.

Other report formats include a U.S. or world mapping to show user density of program 31 versus a sponsor's click through or purchase density. Traditional regression reporting is also enabled. Custom reports which allow the sponsor to select ad packages to be analyzed and variables to consider are also enabled by reporting subroutine 41.

Use and operation of the preferred embodiment of the present invention is as follows. The following is for purposes of illustration and not limitation.

Stored locally on a user's PC is a cookie (technology by Digital Equipment Corp.) for identifying the user and his preferences. The user logs onto the Internet 29 and enters the URL or Website address of program 31 which initializes main routine 39. The URL request is received by Web server 27 which in turn transmits (a) a login advertisement screen view (i.e., from Page Objects 35a,b,c and Ad Package Object 33b) and (b) a request for a cookie that indicates whether this is a first time user. When no cookie is present, the main routine 39 transmits through server 27 the standard introductory screen view page (Home Page 43, FIG. 4a).

Preferably the Home Page 43 (FIG. 4a) is an HTML (HyperText) document generated through the set of Page Objects 35a,b,c. The Home Page 43 describes to new users the data available at the program 31 Website and allows existing users to log in. The Home Page 43 is formed of several graphical and text documents in the HTML and Java formats. For example, behind the "stock data" menu selection a Stock Exchange ticker flashes, and behind the "weather" option, a display of clouds swirling over San Francisco and then sunshine over Washington, D.C. is shown. A clip of a newly released movie plays behind the "Media Schedule" option, and sports scores scroll behind the "Sports" option. At the bottom of the screen view are login fields and prompts.

For a new user, the Home Page 43 effectively requests a user name and password. In response to the user-provided data, main routine 39 immediately builds a cookie if possible. Included in the newly built cookie is a unique user identification code (preferably numeric), time and date of login, and computer identification number to distinguish between home and work logins. Main routine 39/server 27 transmits the created cookie to the user's PC for storage and future use.

Upon the new user selecting a displayed option (by moving the cursor to the desired option and depressing/clicking the mouse button), a request is generated and sent to main routine 39/server 27. In response, program 31 obtains a screen view corresponding to the selection as generated through Page Objects 35a,b,c. Main routine 39 transmits the screen view for display to the user.

Program 31 also creates a new User Object 37a, User Computer Object 37b, User Interface Object 37c, User Session Object 37d, User Action History Object 37e and User Viewing History Object 37f for the new user. User Object 37a records the user-provided name and password used to create the cookie. User Session Object 37d records the login time. User Action History Object 37e records the selection activity of the user. The User Viewing History Object 37f also registers the open and leave times for the initial login advertisement screen view and notes what elements were displayed at that time. Also the Ad Package Object 33b responsible for the initial login advertisement screen view records a "hit" by the new user.

Say for example, the new user selected (i.e., "clicked on") the "Stock Data" option from the Home Page. Program 31 responds by displaying a screen view featuring the exchange prices from various global exchanges. Main routine 39 also enables a banner to appear at the top of the screen reading (for example) "Brought to you by Dean Witter". The user is able to select/click on this banner to effectively request more Dean Witter information from program 31. To accomplish this, the screen view contains a hyperlink formed of the URL for Dean Witter information on the Internet, and program 31 would list the new user as the requester and the current screen view as the page from which he made the request.

In the example, the exchange prices screen view also displays two options: "Quick quotation" and "Build a Portfolio". Say the user selects the former and enters a stock symbol. The screen view also prompts the user to a directory of symbols for use as needed. Near the lower portion of the screen view, there is displayed an area for the user to enter a new stock symbol and an option "button" to effect addition of the corresponding company to the user's portfolio. Also displayed are other selection options as outlined in the Financial Pages formats of Appendix I. Further, main routine 39 displays advertisements in the screen view along the top, bottom and/or sides of the screen as supported by the Page Objects 35a,b,c and Ad Package Objects 33b.

In response to the user's selection and entered stock symbol, a long URL is generated and received by server 27. While no page currently exists at the requested address (the URL), program 31 generates one in response. Specifically, main routine 39 queries the Financial Page Object 35a,b,c (Appendix I) and requests the standard "quick quotation". The Page Objects 35a,b,c assemble the data, format it into a table and return it to Web server 27. Sources of the data include on-line securities information from S & P Comstock and information stored by Page Data Objects 35b.

Simultaneously main routine 39 updates User Action History Object 37e to reflect the user's selection of the "quick quotation" option. User Viewing History Object 37f notes that the user selected an option which had stock data present in blue, for example, with moving graphical elements.

Also main routine 39 selects and includes advertisements on the newly assembled page/screen view at server 27. Main routine 39 accomplishes that by (i) determining, for each Ad Package Object 33b, if the advertisements there are appropriate for the user and (ii) ranking all appropriate advertisements. To determine appropriateness, for each ad placed by a sponsor, the sponsor weights demographic and psychographic criteria by importance and identifies which terms are required. The sponsor then gives a minimum total weight required for a user to see the ad series. The weighted criteria and indications of required terms and minimum total weight are recorded in Ad Series Objects 33c (FIG. 5c).

To rank the advertisements determined to be appropriate, main routine 39 calculates $$\text{Rank} = \left(\frac{\text{\#hits purchased}}{\text{\#hits achieved}}\right)\left(\frac{\text{\#clickthrus purchased}}{\text{\#clickthrus achieved}}\right)\frac{1}{t}\text{cost}(1-D)$$

where #hits and #clickthrus throughs (i.e. number of hits and number of click throughs) purchased and achieved are stored in Ad Package Objects 33b;

t is time remaining and equals end date/time minus current date/time (from Ad Package Objects 33b); and D is a percentage discount of the cost of the ad package, if the ad package is not completed i.e., number of purchased hits and click throughs is not met.

In the preferred embodiment, program 31 automates weighting of criteria and in real time adjusts the intended audience profile of advertisements. To that end, program 31 tracks demographic and/or psychographic criteria of users who view ("hit") and/or select (i.e., "click through") advertisements. Then program 31 performs a traditional regression analysis of the tracked criteria, which results in (i) null and alternative hypothesis testing to determine significance (T-test or $\chi^2$ test) of criteria/variables, and in (ii) squared correlation and squared correlation testing ($R^2$) to determine the weight of each criteria. See D. Freeman, R. Pisani and R. Purves, "Statistics", publishers W. W. Norten & Co., N.Y. 1978 pages 439–444; and Murray Speigel, "Theory and Problems of Statistics," McGraw Hill, N.Y. 1961 pages 270–273. Program 31 uses the T-score (of the T-test) to weight demographic and/or psychographic criteria and to effectively adjust the minimum total weight recorded in the Ad Series Object 33c (FIG. 5c). Program 31 continually performs the foregoing so as to maximize/optimize success of advertisements displayed through server 27.

Referring back to the example, server 27 transmits the generated screen view (i.e., "Quick Quotation Page" of user specified company with user appropriate ads) for display to the user. Next program 31 registers the user's activity with the User Interface Object 37c, User Session Object 37d, and User Viewing History Object 37f corresponding to that user. Also User Viewing History Object 37f records open and leave times for the first screen view ("Quick Quotation Page" of user-specified company) and notes indications of what elements were displayed in that view to the user. Lastly, an additional "hit" is recorded in the Ad Package Object 33b for the advertisements displayed to the user.

When the user requests to add the displayed stock to his portfolio, main routine 39 queries the Financial Page Objects 35a,b,c as before and returns (transmits for display) a Stock Page (Appendix I) including an indication of the stock/company the user requested. The User Interface Object 37c of the user records the new portfolio information. Where the user provides/enters purchase price to program 31, the displayed Stock Pages includes a tally of the user's gains and losses.

The user next selects the Weather category. In response, the set of pertinent User Objects 37 register the user's activities (i.e., what he "clicked on") and record indications of the screen view he was viewing as described before. Main routine 39 prompts the user for his zip code or the name of the city for which he wants weather information. In response to the user specified city, the User Object 37a for the user records an indication of that city as a city of interest to the user. Further, main program 39 generates a Weather Page Object (Appendix I) through Page Objects 35a,b,c to display a weather report for the subject city. This is accomplished in a similar manner to that described above for a Stock Page, but the source of data is one or more on-line services such as Weather Service Corp., Acu Weather, and WSI, for example. As described above, the User Interface Object 37c, User Session Object 37d, User Viewing History Object 37f, and Weather Page Object 35 record (a) open and leave times of the weather screen view, (b) indications of what elements were displayed in that view, and (c) indications of what weather elements the user liked to view in his weather page, including national radar maps and 5-day forecasts.

Say the user now logs out. Program 31 notes the total usage time and adds it to the user's usage log. When the user subsequently logs on, Web server 27 locates his cookie, and main routine 39 queries the User Object 37a, User Computer Object 37b and User Interface Object 37c of the user to identify who he is and what his preferences are. In turn, main routine 39 queries the Financial and Weather Page objects of the user and returns with data (screen views) of that last session. Using this data, program 31 automatically generates a Home Page 43 tailored to the user, i.e., lists his portfolio and the weather in his last specified city.

Also the Home Page 43 displays an option to "click here for weather in other areas". Upon the user doing so and entering a home zip code, program 31 records that information in the User Action History Object 37e and User Object 37a (home zip code field). Program 31 also generates a Weather Page/Screen View for the designated zip code area using the Page Objects 35a,b,c as described above.

Next, say the user selects and uses from the Home Page 43 (i) the Directory to look up a business partner in Detroit, and (ii) the Travel option to look up flight schedules. Screen views of telephone directory pages and travel options/tables are generated and displayed using the Page Objects 35 and Ad Package Objects 33b as described before. That is, the Page Objects 35a,b,c (i) assemble the data from a pertinent agate source whose URL is passed in the initial request/option selection, (ii) format the data into tables, and (iii) return it to server 27. Meanwhile the Ad Objects 33b,c,d determine and return appropriate advertisements to be integrated into the screen view/page. Moreover, the user's User Object 37a records Detroit as another city of interest, and the user's Directory Page Object 35 records his partner's telephone number. Finally, the user's User Interface Object 37c records his travel plans (as inferred from the user's activity with the displayed Travel Page/Screen View). User Interface Object 37c also sets a flag in program 31 to send the user an appropriate weather forecast the day before he travels.

Preferably, the sources of travel and directory data are: services which compile the subject data for use by program 31 administer, satellite sources, or FM transmission sources. One or more such sources are employed as described above for the Stock Page and Weather page/screen views. Likewise, for Sports data, program 31 utilizes Sports Team Analysis and Tracking Systems Inc., for example. For Classified, Personals and Real Estate data, a collection of on-line services is employed. Alternatively, such data is entered into respective objects by a program 31 administrator. Other data sources or a combination of said sources are suitable.

After some time, i.e., several sessions with program 31, the user's User Interface Object 37c holds indications of his categories of interest, including specific items of interest in each category of information, and his display/format preferences (colors, design, layout, etc.). Based on these recorded details, program 31 constantly and automatically tailors screen views (content and presentation) and advertisement selection (subject matter and presentation) for the user. As such, each time the user logs on, program 31 features items that are more interesting and appealing to him (at least potentially so). When a user selects (i.e., "clicks on") an advertisement, the corresponding Ad Package Object 33b records a "click through". This affects the ranking and criteria weighting calculations (discussed above) and further refines the terms of elements to be displayed/presented to a user. Thus the present invention provides a means and method for continually refining the target profile for advertisements.

The messages/notices and warnings feature 45 (FIG. 4b) of program 31 enables users to request warnings for all data categories. In the example, say the user requested that a warning be sent to him for changes in stock price of a certain company. In turn, the User Interface Object 37c records the user specified threshold (e.g., change in price per share) and his E-mail address where he can be reached. When the stock data source issues a message that meets the threshold, the user's Warnings/Notices Object 45 (FIG. 4b) sends an appropriate warning. His Warnings/Notices Object 45 also records a "posting date" of the warning. Upon logging onto his Internet mail, the user sees incoming mail (the warning generated and sent from program 31). Upon logging into program 31, the user is presented with the usual Home Page (tailored to that user) but with an indication of an outstanding warning. If the user selects the "warning" option, program 31 employs a "link" (e.g., HyperText technology) to display that part of his stock portfolio which is pertinent to the warning. The Warnings/Notice Object 45 in turn records the user's read date and time.

Similarly, user-to-user messages and/or notices (e.g., special events or new information available through program 31) are provided to a user. User Viewing History Objects 37f and other User Objects 37 may be searched by program administrators to find users to target notices to, depending on category of information and presentation details. For example, if there is a new satellite picture of a hurricane off the southeast coast, a program administrator could search the User Viewing History Objects 37f to find all users who have in the past viewed weather maps of the southeast coast. The resulting indicated users can then be sent a notice (via their respective Message/Warnings Object 45) saying "Check out hurricane X off the coast of Florida (This message brought to you by White Rain hairspray)", for example.

In the case of a sponsor-user logging on, he may browse through the agate information (categories on the Home Page) and advertisements as described above for an end user, but more importantly he is able to place ads and obtain performance reports. This is accomplished as follows. When a company (sponsor) opens an account with the program administer, the program administrator obtains sponsor information and forms a corresponding Sponsor Object 33a. Advertising information and desired ads of the sponsor are recorded in respective objects. In particular, package information (number of click throughs purchased, pricing and timing details) are recorded in Ad Package Object 33b. Demographic targets are entered in Ad Series Object 33c, and the ad content and information are stored in the Ad Objects 33d.

As discussed above, sponsors have the ability to place ads according to demographic profile. To do so, advertisers/sponsors complete a template (preferably in the Ad Series Objects 33c) which allows them to list certain criteria as required, and to weight other criteria by importance. To ensure ads are shown to the appropriate target users, the sponsor then selects a minimum total weight which a user's demographic/psychographic profile must achieve before the advertisement is shown to the user.

To ensure that sponsors achieve the optimal result from the ads they place, program 31 combines regression analysis with the above weighting technique to achieve real-time, automatic optimization as discussed previously. Under this auto-targeting system, an ad package is shown to general users. After a large number (e.g., 10,000) hits, program 31 runs a regression on a subject Ad Package Object 33b to see what characteristics are important, and who (type of user profile) the ad appeals to most. Program 31 then automatically enters weighting information based on that regression to create a targeted system and runs the advertisement (Ad Package Object 33b) again in front of this new targeted group. Program 31 then runs a regression every 10,000 hits, for example, including a group of 500 general people as a control, and adjusts the weighting. This continues until the Ad Package is exhausted (i.e., the number of hits and click throughs are achieved).

Subsequently when the sponsor-user logs on, the Web server 27 (using cookies if available) identifies the sponsor-user with a user ID stored in the Sponsor Object 33a (FIG. 5a). Preferably, separate cookies are used to identify the user's personal login apart from that of the user as an agent of a sponsor-company. Also program 31 begins recording page information for the sponsor, and begins building a demographic and psychographic profile and usage history upon the sponsor-user entering the system.

Using page Objects 35, program 31 displays an initial screen view and prompts the user for a user name and password. The sponsor-user enters the Company's user name and their password. In response, main routine 39 checks the set of Sponsor Objects 33 and determines this to be the first "visit" since the sponsor placed a new ad. In turn main routine 39 omits displaying the main menu (for sponsor-user) having options to place a new ad, check existing ads, or go to Home Page. Instead main routine 39 uses Page Objects 35 and displays the existing ads section which offers a "reporting" option. Upon the sponsor-user selecting the "reporting" option, main routine 39 lists in a screen view, the standard reports from the corresponding Sponsor Object 33a and an option to generate a custom report.

In response to the sponsor's 33 request for (i.e., selection of) a particular report, main routine 39 calls reporting subroutine 41 which queries Sponsor Object 33a, Ad Package Object 33b, Ad Series Objects 33c and Ads Objects 33d of the sponsor for details. For example, demographic elements, number of click throughs purchased, number achieved to date, number of hits, and time remaining in an advertisement are retrieved. Program 31 then checks the usage logs and retrieves the profile of users who selected the sponsor's advertisement, using the User Objects 37a. The program 31 then generates a report using this data and uses standard statistical regression techniques to find correlation between success and different demographic and/or usage information, and reports those as well. For example, a report comprises several defined elements, including overall success of the advertisement, breakdown by requested demographic elements, comparison of target market with control group, number of click through requested versus number achieved to date, as well as the time remaining in an advertisement. Finally, program 31 completes a regression analysis using data stored in Ad Package Objects 33b and User Objects 37, and suggests other demographic groups which a sponsor might want to consider for a subsequent ad.

When displayed to the sponsor-user, reports may also have ads integrated therein, similar to pages/screen views displayed to users discussed previously. In the example, say another company previously placed an ad targeting advertisers in the telecommunications industry. When the sponsor-user of the example logs in, the server 27 queries the corresponding Sponsor Object 33a for the company's SIC code and industry description. Recognizing a match, program 31 places the other company's ad on the report screen view displayed to the sponsor-user. If the sponsor-user clicks on the ad, program 31 records the hit for the other company's advertisement, just as it would with any other end user. As such, program 31 tracks advertiser usage as user information and develops demographic profiles for advertisers. This data is stored in the sponsor's Users Objects 33a (FIG. 5a). When the sponsor-user of the example decides to create a second package, the sponsor-user clicks on a "request an ad package" option and completes a form detailing the package (number of hits/click throughs requested, profiling, etc.). This time however the sponsor-user decides not to identify a target market for this ad. Impressed by the system's regression information, the sponsor-user decides instead to choose "auto target" and allow program 31 to make the most efficient use of the new ad. Graphics of the new ad are "pasted" onto the form and submitted to server 27.

In response, program 31 creates a new Ad Package Object 33b and links it to the company's existing Sponsor Object 33a. From the data entered into the form, main routine 39 completes the corresponding Ad Package Object 33b, Ad Series Object 33c and Ad Object 33d. In turn, program 31 displays a price quote for running the ad, and the sponsor-user clicks on the "accept" button. This advertisement package becomes available as soon as the sponsor-user has clicked on the "approved" button.

Subsequent login to program 31 completes a similar query to the one above, this time checking for both of the sponsor's advertisements. Reporting subroutine 41 generates a report listing the successes of the ads in two columns of a table. To accomplish this, subroutine 41 uses Sponsor Object 33a, Ad Package, Ad Series and Ad Objects 33b, 33c and 33d.

Say, for example, the sponsor-user decides to follow the success of this new ad and creates a customized report to do so. To build the report, the sponsor-user clicks on the "build custom report" option. Here subroutine 41 sends a report template to the sponsor-user. The sponsor-user selects the new ad series, which promoted a second telephone line for example, and requests a variety of reporting elements. The sponsor-user then names the report "Susan 1". The completed report information is stored in the Advertising Reporting Features Object (Appendix IV). The name of this report will now appear on the report options list of the sponsor when a sponsor-user subsequently logs on.

Program 31 automatically breaks down "auto-targeting" advertisements by time, to demonstrate the increasing success of the ad. The system prepares any requested report with this time breakdown, such that a sponsor can see that the advertisement is becoming more and more successful the longer it runs.

In the preferred embodiment, program 31 allows sponsors to sort groups of users by demographics, to compare success rates of different user groups, advertisements, advertisement aspects, etc. The above described methods employed by subroutine 41 and program 31 provide graphical reports when appropriate and format report data in a manner which is easily printable or transportable to presentations software. For example, in the preferred embodiment, program 31 makes all reports downloadable as an Adobe Acrobat file. Other formats are also suitable.

In order to achieve rapid and direct benefits from the detailed reporting of program 31, program 31 allows the sponsor to enter new advertising contracts on line. If a sponsor recognizes that, for example, 25–35 year-old women tend to purchase frequently and respond to their still, forest green colored advertisements most often, program 31 allows sponsors to place that type of ad in front of the subject target market segment during a reporting cycle. Thus, program 31 enables updating of the Sponsor and Ad Objects 33 during a reporting cycle to accommodate the foregoing.

With respect to reporting, if the reports of program 31 show that customers respond to still advertisements more often than moving ones, bright colors more often than darker ones, graphics rather than text, large text rather than small, detailed text or square advertisements rather than bar style ones, such is relayed to the sponsors/advertisers.

To achieve the foregoing analysis, program 31 classifies aspects of each advertisement (see Ad Objects 33d, FIG. 5d). In a preferred embodiment, such classification is automatically provided by a subroutine of main routine 39. In turn, this allows direct user behavior analysis and psychographic profiling.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, the term "page" is used synonymously with screen view.

In the foregoing discussed example, description of generation of weather, stock, travel and directory pages is provided. Page/screen view and supporting objects in other categories of information are similarly generated.

The use of the term "program administer" singularly or in plural is intended to refer to people who operate the Web site of program 31, or the functional equivalent.

Further, other features, such as the following, may be implemented in program 31 with respect to a respective category of interest.

Stock & Business Data

Perhaps the greatest value added by this section is portfolio accounting. By letting users enter stocks, purchase price, commission, and number of shares, program 31 allows users to track their investments more successfully. In addition to the portfolio, program 31 may provide users an option to create a list of stocks that they follow (i.e., without any of the purchase information), simply so they can separate what they own from what they might buy. Both of these lists are downloadable into Quicken, MS Money, or generic, tab-delineated spreadsheets.

As described above, however, program 31 allows users to be able to build portfolios, initially without registering, etc. Thus it is important to allow users to view detailed stock information for individual companies or groups of companies without building a portfolio. An alternative is displaying in Financial Pages several blanks in which users can place company symbols, with check boxes for the options of "Add these to my Portfolio" or "Add these to my 'Follow these' list".

Company data will also be a major competitive advantage of program 31. Program 31 allows users to examine company data, compare several companies, or compare an SIC-code group, all with a few clicks. Example: Joe Cool wants to compare Apple, IBM, and Compaq. Joe could enter these three into the same blanks used for stock data and, instead of stock data, select corporate information. Joe would receive from program 31 the balance sheets, income statements, etc., all in comparable columns. Joe could also switch to CAGR numbers (Compound Annual Growth Rate, pre-processed by program 31) which allow easier comparisons. Another click (i.e., command/selection) and Joe downloads these as a spreadsheet.

Both stock and company data can also be processed through a few calculations to produce standard business ratios (i.e., price-to-earnings, etc.). Some of these can be pre-processed; some must be done in real-time as they include stock price.

Alerts: For users who are comfortable giving out their E-mail address, the program 31 will send alerts at preset stock prices for stocks in their portfolio list or their "track these" list. E-mail's will be sponsored and will correspond to the "New Items" section on a user's personal page.

Weather

Program 31 uses the weather to determine, in part, where users live and where they are going. As such, program 31 enables users to see the weather in 1, 2 or 3 places they are or would like to be. Thus, another program feature allows users to view weather from more than one place simultaneously.

Program 31 typically gives users a quick glimpse at the 5-day forecast on the login page, with additional information about their local area or others in map format, graphical images (e.g., a snowflake), and data. Weather summaries may be available (short text blurbs) for larger regions, and possibly for individual cities.

The greatest challenge here is how to locate the user. This can be done either with maps, zip codes/postal codes or by city (selectable lists which change by country). Alternatively, it is desirable to have a clickable map which allows the user to get to their location within 2 clicks. Also the system may offer a shortcut where the user can do it by postal code (and have a global database of postal codes). If postal codes duplicate, let the user select from the possible options.

Alerts: Users will be able to request alerts of bad or good (e.g., for weekend plans) weather in their area via E-mail.

Sports Stats

The sports section probably requires the most tailored display capabilities. Users will be able to find game results (broken down by inning/quarter, etc.), league standings, individual player information (RBI, runs, At Bats, etc.) and retrieve some set of these each time they look at sports stats. This will be a natural lead-in to a rotisserie league and will support franchise sites (a good cross-link opportunity). The Web site will also include betting lines.

Initially, users will be welcomed to a site featuring a graphic that represents all of the sports that program 31 covers and the previous day and current day's results, and can select the sport that interests them most, or go immediately to a game of interest. If a sport is selected, program 31 will present teams—or players, if the sport is an individual sport—(organized by standing in leagues, or as is otherwise appropriate by tradition), and allows users to click-through the league or a specific team. At this level (league, team or individual) and on all subsequent levels, the system will allow the user to "track this team" or "track this player."

The next time a user logs on to sports, a screen will compile the user's information, showing all baseball teams (including win-loss record, league, league standing, next game date and time), then all baseball players, etc.

Alerts: program 31 will alert users when their favorite teams are on television or coming to town.

Travel Information

Travel information will include various modes of travel, their schedules (departure/arrival times, perhaps including layovers/transfers), and, when available, costs for tickets (by class) and, if possible, ticket availability information. This is a natural lead-in to on-line bookings. Preferably, program 31 accommodates additions of new carriers and perhaps a section on hotels.

Where possible, program 31 would give users the cost of a seat on that flight, and availability of seats in a specific category.

Alerts: Users will be alerted to weather in towns they are traveling to, airport closings, etc. (Weather Objects may include this.)

Telephone Directory

Users will be able to define a name (first, last), address (city, state, zip), and find all published numbers that match (limited to 100/display, but users can go through more than 1 page of 100). Entire lists can be downloaded into a tab-delimited file with name, address and phone. Users can keep a directory of most called numbers on server 27. Users will receive alerts if someone on their list is no longer listed at the old address.

Visitors to server 27 will have the ability to add E-mail information to their directory information. This will be recorded so long as they maintain the same location. It they move, they will have to re-enter their E-mail address.

Program 31 will also maintain a list of "where are they now" numbers and addresses, i.e., a list of changed addresses and telephone numbers which is searchable in a similar fashion.

Media (TV & Film) Schedules

Users will be able to find television (network and local) and film schedules by zip code. Users will also have the capability to search for a specific'show or film (to see where and when it is playing) or national network/satellite channel, or theater (to see what they are playing).

These lists will feature, in bold, the names of films/shows appearing from any sponsor. Users will have the option of tracking specific channels/themes on their Main (Home) Page 43 or on an adjunct Media-Page.

Classifieds & Personals

Users will have the ability to enter classified and personal advertisements on the network. Program 31 will use the information provided to build demographic profiles when possible.

Entry should be through automatic forms and selectable lists as much as possible, to enable quick search and classification. Users should be able to browse through categories of items, or search them. Classifieds should be searchable by category, model, condition, price, seller's location, and keyword. Personals should be searchable by location, price, gender, orientation, race (if declared), age, and other categories.

To respond to a list, server 27 should allow responders to send a confidential message to a user or program 31, including his/her program identifiers, E-mail address, or telephone number. When someone who posted an advertisement/personal next logs-in, his/her Home Page 43 should contain a message reading "You have responses to your ad!" This hotlink should lead users to a page containing all responses and allowing the user to send simple messages in reply.

Entries, if not renewed, should be removed after two weeks. Users should be able to renew and remove advertisements easily, perhaps by entering a system-provided code.

Reports

Sponsor-user requested reports are generated at the time of request as described above. A real-time report (e.g., JAVA format) would show changes as they occurred during a requested report.

APPENDIX I

Types of Financial Pages
Format 1. Stock Page
Top banner
Portfolio
    Table including user-selected stocks and items listed below
    Items included in a table
        Last Traded At . . . price
        Day/Time of last trade
        $ change
        % change
        volume
        # trades
        open
        prev. close
        bid
        ask
        day low
        day high
        52 week low
        52 week high
        EPS
        P/E
        Market Cap
        Beta
        Dividend
        Dividend Ex Date
        5 year EPS growth
        Currency
        Per share purchase price
        Number of Shares purchased
        Change in individual share value
        Change in share lot value
            Total change in portfolio value
        Portfolio value graph
        Message Window
            List of quickly moving companies/alerts
            List of expert articles
    Tracking List
        (like portfolio, replacing purchase price with "initial tracking value")
    Indices (graphed, listed or value by daily change pointer)
        Dow Jones Industrial Average
        NASDAQ
        Other indices
    Custom Ticker
    Closing Banner
Format 2. Company Page
Top Banner
    SIC Industry code and industry name
    Stock information
        Graph of change
        Table compares these with 3–5 companies in similar SIC group
        Last traded at . . . price
        Day/time of last trade
        $ change
        % change
        volume
        # trades
        open
        prev. close
        bid
        ask
        day low
        day high
        52 week low
        52 week high
        EPS
        P/E
        Market Cap
        Beta
        Dividend
        Divident Ex Date
        5 year EPS growth
        Currency
        Per share purchase price
        Number of shares purchased (if user holds in portfolio)
        Change in individual share value
        Change in share lot value
        Corporate information
        Industry overview
        Products
        Officers and contact info for them
        Historical balance sheet and income statement Tables
        Link to 10K/10Q
        Window—News/Expert articles on that company
    Closing banner
Format 3. Expert Articles Page
    Top banner
    Article (may include tables/links to company data)
    Stock graph for companies discussed
    List of previous articles (with links)
        Bottom banner
Format 4. Expert Guide Page
    Top banner
    Survey pages
    Results page
        Textual description of stock page
        Table of some stocks that they found to fit their description
        Description of "Show me Some" stock option (see below)
    Disclaimer
    Bottom banner
Format 5. Show Me Some Page
    Top banner
    Text description of what page does Table of stocks (generated from where the call for the page came from)
Disclaimer
Bottom banner
Types of Weather Pages
Format 1. National Weather Page
  Top banner
  Maps
    National/Continent Weather Photos & Maps
      Satellite view
      Temperature changes
      Precipitation map
      UV index
  Textual description of the fronts
  Real audio from a celebrity reading his/her forecast
  Bottom banner
Format 2. Regional Weather Page
  Regional (state-sized regions) photos & maps
    Satellite view
    Temperature changes
    Precipitation map
    UV Index
  5-day graphical forecast
    high temp
    low temp
    precip (sunny, partly cloudy, partly sunny, mostly cloudy, cloudy, rain/snow)
  Detailed 5 day forecast (table & text)
    high temp
    low temp
    winds
    wind chill
    precip
    UV index
    textual description
  Weather warnings
  Bottom of the page ad
Types of Sports Pages
Format 1. Sports Page (General Sports Page)
  Top of page ad
  Game scores by league (user drill-down to game page)
    4 pros and 2 collegiate
  Standings in league
    4 pros and 2 collegiate
  Player standings by major category (for pros 4 and college 2)
    Baseball
    Football
    Hockey
    Basketball
  News window for each sport showing recent (e.g., 2–3 days worth of news) with link to News Page for more.
  Custom scores ticker
Format 2. News Page (windows will be Java scrolling including new news where possible)
  Top ad
  Major trades/signings
  Injuries
  Other news windows
  Bottom ad
Format 3. Team Page
  Top ad
  Team name
  Team logo (if permission granted)
  Roster
    Player names
    Player numbers
    Player position
    Short stats list
  Bottom ad
Format 4. Team v. Team Page
  Top ad
  Table—2 columns
    Team names & team logos (if permission for BOTH)
    Team rosters, with players opposite one another
    Performance stats in competition
  Odds-makers bets on coming games
  Ticker with game scores for entire season
  Bottom ad
Format 5. Player Page
  Name
  Team name
  Position
  Stats list
    Runs scored (season)
    RBI
    Batting average
Format 6. Player v. Team Page
  Top advertisement
  Player name and team name
  Player stats against this team only (table)
  Odds of various events in table
  Bottom ad
Format 7. Player v. Player Page
  Top advertisement
  Table with two columns
    Player names
    Relevant stats in previous matches
  Odds in table
Media Schedule Page
  TV Table
    Show
    Channel
    datetime start
    datetime end
    rating
    rerun?
  Film Table
    Film name
    Director
    primary actors (3)
    theater
    times
    length
    rating
    comedy/drama/action/documentary/musical classic/new film
  Theater/Opera/Symphony Table
    Theater
    Show title
    Show times
    Director
Travel Options Page (by City)
  Advertisement (Top)
  Table with travel options
    Transport type airline
bus
boat
train
Schedule
  Departure
    city
    time
  Stops (could be multiple)
    city
    arrival time
    departure time
  Arrival
    city
    time
Reservation Information
  seats available
  cost/ticket
  restrictions
  requirements
    passport?
    visa
    photo ID
  number to call for reservation
Table with room and board options in destination
  Hotels
    name
    address
    price/night
      weekday
      weekend
    max # in room
    bedding
      king (number?)
      queen (number?)
      single (number?)
      cot (number?)
    television
    cable TV
    pool
    a/c
    number to call with reservation
  Rental car options
    Dealers
      name
      address
      telephone
    Car options (for days available)
      make/model
      price/day
End of page ad
Personals Page (result of search by categories)
Top of Page Ad
Table comprising search results
  geographic
    city
  demographic
    gender
    age
    income bracket
    occupation
  lifestyle
    language
    smoker
    orientation
    lifestyle (vegetarian)
    race
    drinker
    marital status
    music
    weight
    height
  Ad text
End of page ad
Classifieds Page
  Beginning of page ad
  Response from search
    Item name
    Make
    Model
    Price
    Year
    Available date
    Description
  End of page ad
Real Estate Pages
Format 1. Citywide Listings Page
  Beginning of page ad
  Table showing
    address
    price
    dwelling type
    square footage
    price/sq.foot
  End of page ad
Format 2. Selected Listings Page
  Top Ad
  Table (includes only those listings selected by the user)
  Table including
    address
    price
    square footage
    price/sq.foot
    dwelling type
    eat-in-kitchen (EIK)?
    number of bedrooms
    number of baths
    parking?
      number of off street
      number of garage
    yard size (if any)
    deck?
    pool?
    construction type (brick, wood, etc.)
    heat type
    central air?
    available date
  Bottom ad
Format 3. Individual Listings Page
  Beginning of Page Ad
  Table including
    address
    price
    square footage
    price/sq. foot
    dwelling type
    eat-in-kitchen (EIK)?
    number of bedrooms
    number of baths
    parking?
      number of off street
      number of garage yard size (if any)
deck?
pool?
construction type (brick, wood, etc.)
heat type
central air?
available date
Textual Description
Contact information for house
  Owner/agent name
  telephone
  E-mail/program 31 messaging
Photo (if paid advertisement)
Floor plan (if paid advertisement)
Map of city with house marked (using 9 digit zip)
End of page ad

APPENDIX II
City Pages
  Travel Options from User's Hometown
    See Travel Options Page above
  Media/Cultural Event Schedules in Table
    Name of event/show
    location/channel
    datetime begins
    datetime ends
    ticket cost (if any)
  Corporate Information for Local Companies (Table)
    Name
    Industry
    Revenues
    Contact Info
      street address
      city
      state
      zip
      telephone
      fax
      E-mail
  Weather
    graphical 5-day forecast for city
  Directory (numbers in city user has accessed before)
    Name
    Address
      street
      city
      state
      zip
    Telephone
    fax
    E-mail
    Notification of changes in address list

APPENDIX III
User Customized Categories
  Financial Information
    Data from two primary sources
      S&P Comstock from variety of exchanges.
      (Note some of these items may not be available.)
        last traded at
        day/time of last trade
        $ change
        % change
        volume
        # trades
        open
        prev. close
        bid
        ask
        day low
        day high
        52 week low
        52 week high
        EPS
        P/E
        Market cap
        beta
        Dividend and ex
        5 year EPS growth
        currency
    Ticker-company translator
    EDGAR
      revenues
      earnings
      product descriptions
  Preformatted data analysis for user profiles
    bid
    ask
    last
    $ change
    52 wk high
    52 wk low
    p/e
  Portfolio view—user selected stocks
    current information
    tabular (selected attributes)
    total value if user includes # shares
    changed value if user includes purchase price;
      allow multiple purchases of same stock for several
        different purchases by doing Quicken-like pull-
        down entry for several lots of same stock
    user formatted output
    value-added analysis tools and data
      Prepared analytical views for user selected data.
        Includes customized info . . . here's my data and
        here are some forms of analysis. Options range
        from numeric to "Thumbs-up, Thumbs down".
        What info do you want
          e.g., Dorfman's ratings (for every stock; based
          on designated user goals and profiles)
          trip next year
          college
          retirement
        what items do you like?
          e.g., Beardstown ladies What businesses are
          doing well in your neighborhoods? What shoes
          are your kids wearing?
      Prepared profiles to assist users in selecting data. I
        give you my easy walk-through analysis and you
        give me the data that fits it (I want college stocks
        and you suggest them).
        Like TurboTax software
        ADD info from here to user profile
      Direct User Selection of categories and display (like
        TERMS)
  Sports
    Sports stats
      initially for big 4 professional leagues eventually
        adding college and golf, tennis, auto and horse
        racing
    preformatted data packages include
      daily report on selected team/player stats value-added analysis tools and data
- Prepared analytical views by experts. Program administrator will try to get sports personalities from major cities nationwide as well as a few national sportscasters. The program administrator will allow users to follow those they find compelling.

What info do you want
- Sports personality ratings (for every team; based on what Terry believes is important, for the teams the user likes)
  - e.g. by Dan Deardorf
  - by Stan Savrin
  - by Terry Bradshaw
    - includes the categories important to the analyst and their thumbs-up or thumbs-down stat
    - overall rating by Dan defensively, etc.
- Prepared profiles to assist users in selecting data. I give you my easy walk-through analysis and you give me the data that fits it (I want football teams and a simple comparison, you suggest them).
  - walks through important stats and what they show; allows user to select teams; prepares standard profiles for selected teams, including basic analysis
- Direct user selection of categories and display (like TERMS)
  - user chooses categories
  - user chooses teams
  - program 31 builds grids
- Warnings:
  - when team is on TV channel (allow user to select networks that are available); when team is coming to town; when major news events (trades, etc.) occur Weather
- data from single provider
  - includes city-by-city and airport reports and projections
  - includes zip-code locator for cities
  - includes graphical files prepared by data supplier
- locator map
  - allows users to click to locate
    - increasingly accurate maps global in scope result in location that links to local weather data.
  - description by expert(s)—lets user view how Joe Denardo or Willard Scott views the weather and why.
- Prepared profiles to assist users in selecting data. Very simple for weather: helps users to select their area and what weather items interest them. Emphasizes ability to select "weather warnings" from the system.
- Direct User Selection of categories & display (like TERMS) Warnings/Notices
  - Severe weather in their area or other areas they monitor
  - Good weather coming in potential vacation spots Travel
- data
  - centered on "from:" and "to:" cities include schedules, pricing and seating class availability for airlines, buses and trains
- preformatted data packages
  - allow user to simply select two cities (airports), date and time (optional) of travel, and view their travel options.
  - Sortable by time, cost, seating available value-added analysis tools and data
  - Featured travel packages prepared by travel experts
- Prepared profiles to assist users in selecting data
- Easy walk-through analysis and program 31 gives the data that fits
  - What city are you in?
  - Where do you want to go?
  - When do you want to travel?
  - What's your greatest priority?
    - cost
    - convenience
    - non-stop
  - ADD this information to user profile
  - Direct user selection of potential flights warnings/notices
  - discount fares to cities the user has examined;
  - poor travel conditions to cities the user has examined;
  - fares falling below a certain point to cities the user has selected Telephone
- Includes telephone, address and allows user to add E-mail and URL value-added analysis tools and data
  - Allows user to send E-mail (when listed) directly to another user;
  - Allows user to build list of regularly used numbers and addresses (automatically generated from selected data);
  - Prepared profiles to assist users in selecting data;
  - Helps users to limit searches so they will be most effective
    - ADDs info from here to user profile quick look-up feature (just give last name, first initial and state) detailed searching: allows all users to search by name, address, E-mail, etc. warnings:
    - when information changes that is listed in user list Personals
- data entered by users
- data entry uses preformatted forms with many optional categories
- value added analysis tools and data
  - Prepared analytical views for user entered profiles from Dr. Ruth to Oprah.
  - What kind of a person are you? What do you want?
    - Oprah's ratings (based on which items Oprah thinks are important)
    - age
    - smoker/non
    - cook?
  - Prepared profiles to assist users in entering data and giving importance to their data items.
  - Easy walk-through analysis
    - Helps users to input their info (automatically lists them on network if they like, allowing anonymous entries and replies)
    - Completes search
    - Helps user send message
  - Direct user selection through browsing or complex searching
- Warnings/notices
  - responses to ads placed
  - "most interesting singles ad of the week"
  - Oprah's latest recommendation for you Classifieds
- data entered by users
- data entry uses preformatted forms with many optional categories (depending on product selected)
  product
  cost
  size
  weight
  doors (2 or 4)
  horsepower
  cylinders
  negotiable?
  manufacturer
  age/year of purchase
  warranty?
  location of item
  text description
value-added analysis tools and data
  Prepared analytical views for user entered profiles, from CarTalk to other industry experts.
    What do you want? What are your priorities?Car Talk ratings on makes, models, etc. for autos, and other experts on other categories: CONSUMER REPORTS?
    price
    year
    make/model
  Prepared easy walk-through category selection
    Helps users to select items they want, identifying and sorting by their most critical categories
    Completes search
    Helps user send message
  Direct user selection through browsing or complex searching
Warnings/Notices
  responses to ads placed
  bidding/counter-bidding process

APPENDIX IV

Advertiser Reporting Features
Web-based reporting includes advertisements targeting the advertisers
Please contact me . . . I want to advertise on server 27
Place/delete ad packages (for existing accounts only)
Reporting
  Allows drill-down through to individual user level
Types of Reports
1. Overview of program 31 advertising
  Broken down by ad packages
  Shows
    HTs purchased and achieved
    CTs purchased and achieved
    Purchases (if applicable)
    Cost of package
    Date specified by package
    Can click through to detailed package reports
2. Detailed Package Reports (for individual packages)
  Shows ads included in package
  Media (visible/playable here)
  HTs purchased and achieved
  CTs purchased and achieved
  Purchases (if applicable)
  Cost of package
  Demographic profiling requested
  Demographic breakdown of success v. control group
3. Demographic Response Rates
  Includes all packages or selected ones
  Compares (if several) ad success by demographic groups selected as important to advertiser
  Automatically runs regression in background and suggests other demographic characteristics that are important factors in CTs and/or purchases
    Allows advertiser to auto-generate a complete regression report for a specific package, subset of packages or all packages.
4. Psychographic Profiling
  Includes all packages or selected ones
  Compares (if several) ad success by psychographic groups selected as important to advertiser
  Automatically runs regression in background and suggests other demographic characteristics that are important factors in CTs and/or purchases
    Allows advertiser to auto-generate a complete regression report for a specific package, subset of packages or all packages.
5. Mapping (U.S. or world locations)
  Generates map to show program 31 user density v. the sponsor's CT or purchase density
  Allows scalability
6. Regression (demographics)
7. Custom reports
  Very like TERMS
  Advertiser selects packages to analyze
  Advertiser selects variables to consider
  System generates reports
  Custom reports can be caved on server 27

I claim:

1. In a computer network formed of a communication channel and a plurality of digital processors coupled to the communication channel for communication thereon, computer apparatus for initially creating a psychographic profile of a user comprising:

a data assembly for providing and supporting display of agate information to users of the computer network, in response to a user request the data assembly transmitting requested agate information across the communication channel to one of the digital processors for display of the requested agate information and viewing by the user; and a tracking and profiling member responsive to the data assembly upon display of the requested agate information, in response to a user viewing requested agate information obtained through the data assembly, the tracking and profiling member recording indications of physical activity by the user during viewing of the displayed requested agate information, said physical activity being with respect to the displayed requested agate information and including user response to the displayed requested agate information, such that said recorded indications of physical activity by the user generates a psychographic profile of the user.

2. Apparatus as claimed in claim 1 wherein the agate information provided by the data assembly includes at least one of stock and market data, theater and television schedules, sports statistics, weather information, travel information and Directory information.

3. Apparatus as claimed in claim 1 wherein:

the tracking and profiling member records format preferences of users with respect to presentation of certain agate information, the format preferences including color schemes, text size and shapes; and in response, the data assembly displays agate information to a user (a) in a manner customized according to the format preferences of the user and (b) having contents corresponding to the psychographic profile of the user.

4. Apparatus as claimed in claim 3, wherein the tracking and profiling member further records demographic information of the user such that demographic profiles of users are provided and the data assembly further displays agate information to a user according to demographic profile of the user.

5. Apparatus as claimed in claim 1 further comprising an advertising component coupled between the data assembly and tracking and profiling member, the advertising component holding a plurality of advertisements to be displayed to users on the network, in accordance with the psychographic profiles of the users, and for each advertisement, the advertising component providing a target profile of desired users to whom to display the advertisement.

6. Apparatus as claimed in claim 5 wherein the tracking and profiling member further provides demographic information about a user; and for each advertisement, the data assembly transmits the advertisement for display with agate information to users having a psychographic profile and a demographic profile substantially matching the target profile of the advertisement to provide targeted marketing.

7. Apparatus as claimed in claim 5 wherein the advertising component further records history of users viewing the advertisements, including for each advertisement, at least one of (i) number of times viewed by a user, (ii) number of times selected for further information, and (iii) number of times a purchase was obtained through the advertisement.

8. Apparatus as claimed in claim 7 further comprising a subroutine coupled to the advertising component for performing a regression analysis on the history of users viewing the advertisements, and therefrom the subroutine refining the advertisement target profiles of desired users to whom to display the advertisements.

9. Apparatus as claimed in claim 8 wherein for each advertisement, the subroutine includes performing a regression analysis and refining the target profile of the advertisement upon a user viewing the advertisement, such that the target profiles of the advertisements are refined in real time.

10. In a computer network formed of a communication channel and a plurality of digital processors coupled to the communication channel for communication thereon, a method for initially creating user profiles comprising the steps of:

provided and supporting display of agate information for viewing by users of the network;

for each user, during user viewing of agate information, recording indications of physical activity including response by the user with respect to agate information being viewed by the user;

from the recorded indications of physical activities and responses of the user, creating user profiles of the users, each user profile providing an indication of categories of interest to the user and display preferences for each category.

11. A method as claimed in claim 10 wherein the step of providing and supporting display of agate information includes providing and supporting display of at least one of stock data, media schedules, sports news, weather information, travel information, and directory information.

12. A method as claimed in claim 10 wherein the step of providing and supporting display of agate information includes displaying advertisements to users by (i) providing advertisements, (ii) for each advertisement, providing a target profile of desired users to whom to display the advertisement, and (iii) for each user, comparing user profile to target profiles of the advertisements and displaying advertisements having target profiles substantially matching the user profile.

13. A method as claimed in claim 12 wherein the step of recording further records user viewing activity with respect to displayed advertisements; and further comprising the step of continually refining target profiles of desired users to whom advertisements are to be displayed by (a) performing regression analysis of recorded user viewing activity with respect to each advertisement, and (b) for a given advertisement, weighting importance of target profile characteristics based on the regression analysis such that the step of comparing finds a substantial match between a user profile and the target profile upon a total score of the target profile characteristics that match characteristics of the user profile meeting a predefined threshold.

14. In a computer network formed of a communication channel and a plurality of computers coupled to the communication channel for communication thereon, a method for defining profiles of target users comprising the steps of:

(a) providing a source of displayable information, the source holding a multiplicity of pieces of information;

(b) for each of certain pieces of information in the source, setting respective initial profiles of target users to receive the certain piece of information;

(c) transmitting each of the certain pieces of information across the communication channel such that each is displayed only to users having a profile substantially matching the respective initial profile of the certain piece of information;

(d) recording computer activity by users during display and user viewing of the certain pieces of information, said computer activity including physical activity and response by the user during viewing of the certain pieces of information;

(e) redefining the initial profiles of target users based on a regression analysis of the recorded computer activity of users, said redefining forming respective adjusted profiles of target users for each of said certain pieces of information; and (f) continually repeating steps (c) through (e) with the adjusted profiles of the certain pieces of information, such that the certain pieces of information over time, become better targeted to users having an interest in said information and hence said method is self-tailoring.

15. A method as claimed in claim 14 wherein the step of providing a source of displayable information includes providing agate information.

16. Method as claimed in claim 15 wherein the step of transmitting includes displaying to users agate information in real time of events generating the agate information.

17. Method as claimed in claim 16 wherein the step of transmitting and displaying includes displaying agate information in predefined schedules to coordinate with at least one of television and radio broadcast of events generating the agate information.

18. Method as claimed in claim 16 wherein the step of displaying agate information further includes updating of the information, in real-time of the events generating the agate information, in a manner such that the agate information is viewable alongside television viewing of said events.

19. A method as claimed in claim 14 wherein the step of providing a source of displayable information further includes providing advertisements as the certain pieces of information.

20. A method as claimed in claim 19 wherein the step of setting respective initial profiles of target users includes allowing sponsors of the advertisements to indicate relative importance of demographic and psychographic criteria of target users.

21. A method as claimed in claim 20 wherein the step of redefining the profiles of target users includes using the regression analysis to weight importance of the demographic and psychographic criteria of target users.

22. A method as claimed in claim 21 wherein the step of transmitting includes (a) determining appropriateness of each of the certain pieces of information with respect to each user, by matching the weighted demographic and psychographic criteria to characteristics of the profile of the user, upon a total score of the matching meeting a predefined minimum desired score, the piece of information being determined to be appropriate for the user; and (b) ranking the certain pieces of information determined to be appropriate with respect to a user such that said ranked certain pieces of information are transmitted in order to the subject user.

23. A method as claimed in claim 22 wherein the step of redefining profiles of target users is performed in real time of subject users viewing the certain pieces of information, such that the step of determining appropriateness constantly updates which of the certain pieces of the information is to be transmitted to each of subject users.

24. A method as claimed in claim 19 further comprising the step of reporting the continually adjusted profiles of target users of the advertisements and user profiles to whom the advertisements have been transmitted, said reporting being accomplished during the continual repeating of steps (c) through (e), such that said reporting is in real time of users viewing the advertisements and the adjusted profiles being redefined.

25. A method as claimed in claim 24 wherein the step of reporting includes displaying to sponsors of the advertisements, characteristics of the adjusted profiles each time the profiles of target users is redefined, such that sponsors are able to view in real time the advertisements becoming better targeted.

26. A method as claimed in claim 14 wherein the step of recording builds psychographic profiles of users; and the step of redefining is further based on a regression analysis of the psychographic profiles of users as recorded in the recording step.

27. A method as claimed in claim 14 wherein the step of redefining the profiles of target users includes performing the regression analysis in real time of users viewing and interacting with the certain pieces of information, such that the profiles of target users are redefined throughout transmission and display of the certain pieces of information in the computer network.

28. A method as claimed in claim 14 further comprising the step of defining, for each user, a user profile based on the recorded computer activities of the user with respect to pieces of information viewed by the user, each user profile indicating preferences in content and presentation of information to that user, said step of defining a user profile including determining the user profile upon user interactivity with displayed information, through input means coupled to a computer, coupled to the computer network.

* * * * *

(12) EX PARTE REEXAMINATION CERTIFICATE (8324th)
United States Patent
Gerace

(10) Number: US 5,848,396 C1
(45) Certificate Issued: Jun. 14, 2011

(54) METHOD AND APPARATUS FOR DETERMINING BEHAVIORAL PROFILE OF A COMPUTER USER

(75) Inventor: Thomas A. Gerace, Cambridge, MA (US)

(73) Assignee: Wells Fargo Bank, Palo Alto, CA (US)

Reexamination Request:
No. 90/010,544, May 18, 2009

Reexamination Certificate for:
Patent No.: 5,848,396
Issued: Dec. 8, 1998
Appl. No.: 08/634,900
Filed: Apr. 26, 1996

(51) Int. Cl.
*G06Q 30/00* (2006.01)
*H04L 29/06* (2006.01)
*H04L 29/08* (2006.01)

(52) U.S. Cl. .................. 705/7.33; 705/14.49; 705/7.29; 725/14; 725/46

(58) Field of Classification Search .................. None
See application file for complete search history.

(56) References Cited

U.S. PATENT DOCUMENTS

| | | |
|---|---|---|
| 4,249,213 A | 2/1981 | Imaide et al. |
| 5,446,919 A | 8/1995 | Wilkins |
| 5,717,923 A | 2/1998 | Dedrick |
| 5,754,939 A | 5/1998 | Herz et al. |
| 5,901,287 A | 5/1999 | Bull |
| 5,918,014 A | 6/1999 | Robinson |
| 6,202,058 B1 | 3/2001 | Rose et al. |

OTHER PUBLICATIONS

Sheth, B., and Maes, P., "Evolving Agents for Personalized Information Filtering", In Proceedings of the Ninth Conference on Artificial Intelligence for Applications, 1993 IEEE Computer Society Press.

*Primary Examiner*—Zoila E Cabrera

(57) ABSTRACT

Computer network method and apparatus provides targeting of appropriate audience based on psychographic or behavioral profiles of end users. The psychographic profile is formed by recording computer activity and viewing habits of the end user. Content of categories of interest and display format in each category are revealed by the psychographic profile, based on user viewing of agate information. Using the profile (with or without additional user demographics), advertisements are displayed to appropriately selected users. Based on regression analysis of recorded responses of a first set of users viewing the advertisements, the target user profile is refined. Viewing by and regression analysis of recorded responses of subsequent sets of users continually auto-targets and customizes ads for the optimal end user audience.

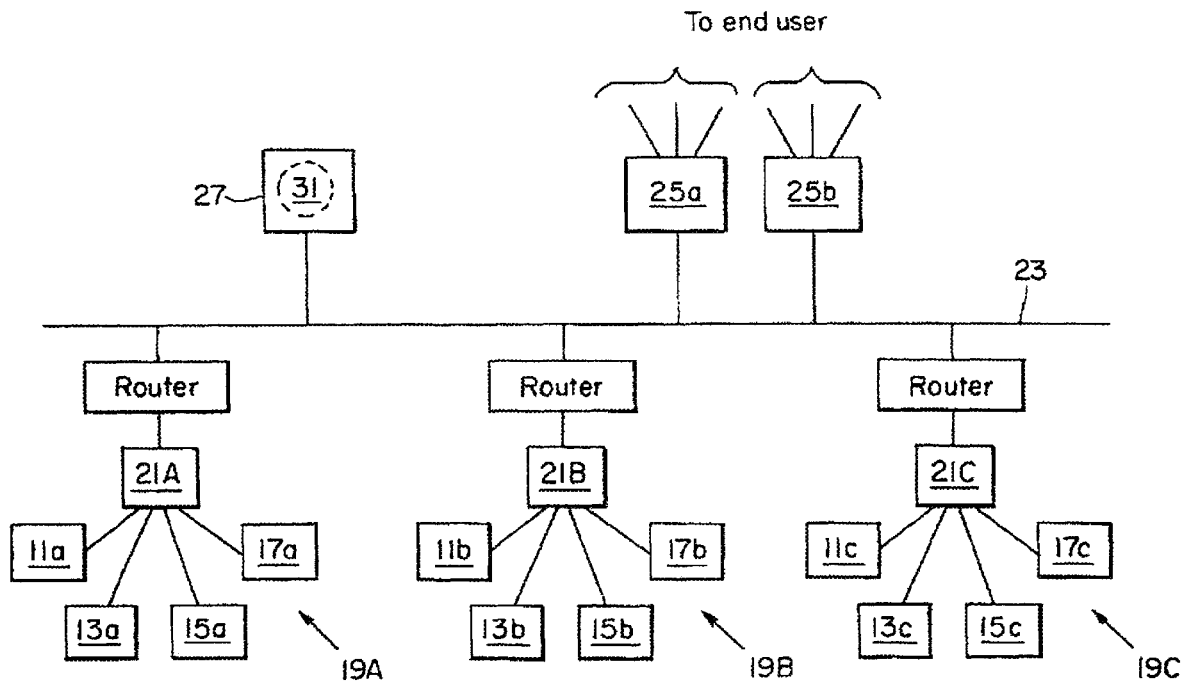

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7-9 is confirmed.

Claims 1-6 and 10-28 are cancelled.

\* \* \* \* \*